(12) United States Patent
Tsuchida et al.

(10) Patent No.: US 10,947,994 B2
(45) Date of Patent: Mar. 16, 2021

(54) ELECTRIC BLOWER AND ELECTRIC EQUIPMENT

(71) Applicant: Mitsubishi Electric Corporation, Tokyo (JP)

(72) Inventors: Kazuchika Tsuchida, Tokyo (JP); Naho Adachi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 57 days.

(21) Appl. No.: 16/096,884

(22) PCT Filed: Jul. 13, 2016

(86) PCT No.: PCT/JP2016/070713
§ 371 (c)(1),
(2) Date: Oct. 26, 2018

(87) PCT Pub. No.: WO2018/011917
PCT Pub. Date: Jan. 18, 2018

(65) Prior Publication Data
US 2019/0136872 A1    May 9, 2019

(51) Int. Cl.
*F04D 29/62* (2006.01)
*F04D 29/056* (2006.01)
(Continued)

(52) U.S. Cl.
CPC .............. *F04D 29/62* (2013.01); *B25F 5/008* (2013.01); *F04D 17/08* (2013.01); *F04D 17/16* (2013.01);
(Continued)

(58) Field of Classification Search
CPC .......... B25F 5/008; H02P 29/60; H02P 29/64; H02P 29/66; H02P 29/662; H02P 29/664;
(Continued)

(56) References Cited

U.S. PATENT DOCUMENTS 1,476,776 A * 12/1923 Stamm ..................... H02K 9/06
417/350
3,836,291 A * 9/1974 Bottcher .................. H02K 5/12
415/55.1
(Continued)

FOREIGN PATENT DOCUMENTS

DE         3823158 A1 * 1/1990  ............. H02K 7/125
DE    102012203809 A1 * 9/2013  ............... H02K 7/12
(Continued)

OTHER PUBLICATIONS

Translation DE3823158.*
(Continued)

*Primary Examiner* — David Hamaoui
*Assistant Examiner* — Brian O Peters
(74) *Attorney, Agent, or Firm* — Posz Law Group, PLC

(57) ABSTRACT

An electric blower includes: a motor including a rotary shaft; a first centrifugal fan fixed to a first end side of the rotary shaft; a second centrifugal fan fixed to a second end side of the rotary shaft opposite to the first end side; and a casing surrounding the motor, the first centrifugal fan and the second centrifugal fan. In the electric blower, first force applied by the first centrifugal fan to the rotary shaft in a first direction in an axial direction of the rotary shaft and second force applied by the second centrifugal fan to the rotary shaft in a second direction in the axial direction of the rotary shaft are opposite to each other during rotation of the rotary shaft.

18 Claims, 18 Drawing Sheets

(51) Int. Cl.
     *F04D 29/04*     (2006.01)
     *F04D 25/16*     (2006.01)
     *F04D 29/053*     (2006.01)
     *F16C 19/54*     (2006.01)
     *F04D 17/08*     (2006.01)
     *B25F 5/00*     (2006.01)
     *F04D 17/16*     (2006.01)
     *F04D 29/051*     (2006.01)
     *F04D 29/58*     (2006.01)

(52) U.S. Cl.
     CPC ........... *F04D 25/166* (2013.01); *F04D 29/04* (2013.01); *F04D 29/051* (2013.01); *F04D 29/053* (2013.01); *F04D 29/056* (2013.01); *F16C 19/54* (2013.01); *F04D 29/5806* (2013.01); *F16C 2360/44* (2013.01)

(58) Field of Classification Search
     CPC ........... H02K 1/22; H02K 1/28; H02K 7/003; H02K 7/04; H02K 2201/00; H02K 2201/03; F04D 29/042; F04D 29/052
     See application file for complete search history.

(56) References Cited

U.S. PATENT DOCUMENTS

| | | | |
|---|---|---|---|
| 6,398,517 | B1 | 6/2002 | Choi |
| 2007/0114870 | A1* | 5/2007 | Lee ................... H02K 17/165 310/166 |
| 2013/0076172 | A1* | 3/2013 | Koyama ................ H02K 9/14 310/63 |
| 2013/0223997 | A1 | 8/2013 | Childe et al. |

FOREIGN PATENT DOCUMENTS

| | | | | |
|---|---|---|---|---|
| JP | S49-136047 | | 11/1974 | |
| JP | 58-038301 | A | 3/1983 | |
| JP | H4-19700 | U | 2/1992 | |
| JP | H9-100800 | A | 4/1997 | |
| JP | H10-26100 | A | 1/1998 | |
| JP | H11-173298 | A | 6/1999 | |
| JP | H11-182485 | A | 7/1999 | |
| JP | H11-225917 | A | 8/1999 | |
| JP | 2000-045990 | A | 2/2000 | |
| JP | 2002-048099 | A | 2/2002 | |
| JP | 2002-364556 | A | 12/2002 | |
| JP | 2006-177289 | A | 7/2006 | |
| JP | 2010-071170 | A | 4/2010 | |
| JP | 2013-044435 | A | 3/2013 | |
| JP | 2015-031202 | A | 2/2015 | |
| WO | WO-2013056458 | A1 * | 4/2013 | ............. H02K 21/24 |

OTHER PUBLICATIONS

Translation of WO2013056458.*
Translation of DE102012203809.*
International Search Report of the International Searching Authority dated Oct. 11, 2016 for the corresponding international application No. PCT/JP2016/070713 (and English translation).
Office Action dated Apr. 7, 2020 in corresponding CN application No. 201680087451.0 ( and English translation).
Office Action dated Sep. 15, 2020 in connection with counterpart Chinese Patent Application No. 201680087451.0 (and machine English translation).
Office Action dated Jan. 26, 2021 issued in corresponding to JP patent application No. 2020-008992 (and English machine translation).

* cited by examiner

ELECTRIC BLOWER AND ELECTRIC EQUIPMENT

CROSS REFERENCE TO RELATED APPLICATION

This application is a U.S. national stage application of International Patent Application No. PCT/JP2016/070713 filed on Jul. 13, 2016, the disclosure of which is incorporated herein by reference.

TECHNICAL FIELD

The present invention relates to an electric blower and electric equipment including the electric blower.

BACKGROUND ART

An electric blower can be formed mainly with a motor and a fan attached to a rotary shaft of the motor. In such an electric blower, at the time of rotation of the fan, noise due to vibration occurs in the fan, the motor and a bearing rotatably supporting the rotary shaft. As a method for reducing the noise, there is a method in which a gap (clearance) between an inner ring and an outer ring of the bearing at the time of rotation is decreased.

For example, Patent Reference 1 discloses a rotor assembly including a shaft, a bearing assembly and an impeller. The bearing assembly includes a first bearing, a second bearing, a spring applying a preload to each of the first bearing and the second bearing, and a sleeve surrounding these components. By the aforementioned preload, the clearance occurring between the inner ring and the outer ring of each bearing is decreased. With this method, this rotor assembly suppresses the noise from the bearings at the time of rotation of the shaft.

PATENT REFERENCE

Patent Reference 1: Japanese Patent Application Publication No. 2013-044435

However, in the rotor assembly described in the Patent Reference 1, aerodynamic static pressure caused by the rotation of the impeller acts on each bearing as a thrust load in addition to the preload from the spring and that disturbs the balance in the rotor assembly in the rotation axis direction. Further, in the rotor assembly, there is the apprehension of a shortened operating life of the bearings due to the wear of the bearings since the thrust load works on the bearings.

On the other hand, downsizing of electric blowers requires an increase in the output power. The amount of work performed by the fan of an electric blower is determined by the static pressure and an air flow rate, and downsizing the fan for the purpose of downsizing the electric blower leads to a decrease in the air flow rate. Therefore, the static pressure has to be increased in order to downsize the electric blower, and employing not an axial flow fan but a centrifugal fan having high aerodynamic efficiency is being desired for the purpose of increasing the static pressure. However, if a centrifugal fan is installed in an electric blower so as to increase the static pressure, a negative pressure load acts on the fan due to a pressure difference. Then, the bearing rotatably supporting the rotary shaft receives the force via the rotary shaft and that affects the operating life of the bearing.

As described above, if a centrifugal fan is employed for the purpose of downsizing the electric blower, the force in the axial direction (thrust force) applied to the rotary shaft increases, the force balance in the electric blower in the motor's axial direction is disturbed, the wear of the bearing rotatably supporting the rotary shaft progresses, for example, and the operating life is shortened.

SUMMARY

An object of the present invention, which has been made to resolve the above-described problems, is to provide an electric blower capable of reducing the force in the axial direction applied to a rotary shaft of a motor at the time of rotation of a centrifugal fan, and to provide electric equipment including the electric blower.

An electric blower according to an aspect of the present invention includes: a motor including a rotary shaft; a first centrifugal fan fixed to a first end side of the rotary shaft; a second centrifugal fan fixed to a second end side of the rotary shaft opposite to the first end side; and a casing surrounding the motor, the first centrifugal fan and the second centrifugal fan, wherein first force applied by the first centrifugal fan to the rotary shaft in a first direction in an axial direction of the rotary shaft and second force applied by the second centrifugal fan to the rotary shaft in a second direction in the axial direction of the rotary shaft are opposite to each other during rotation of the rotary shaft.

Electric equipment according to another aspect of the present invention includes the above-described electric blower.

According to the present invention, the force in the axial direction applied to the rotary shaft of the motor at the time of rotation of the centrifugal fan can be reduced in the electric blower.

DETAILED DESCRIPTION

Electric blowers and electric equipment according to embodiments of the present invention will be described below with reference to the drawings.

(1) First Embodiment (1-1) Configuration

Figure 1:
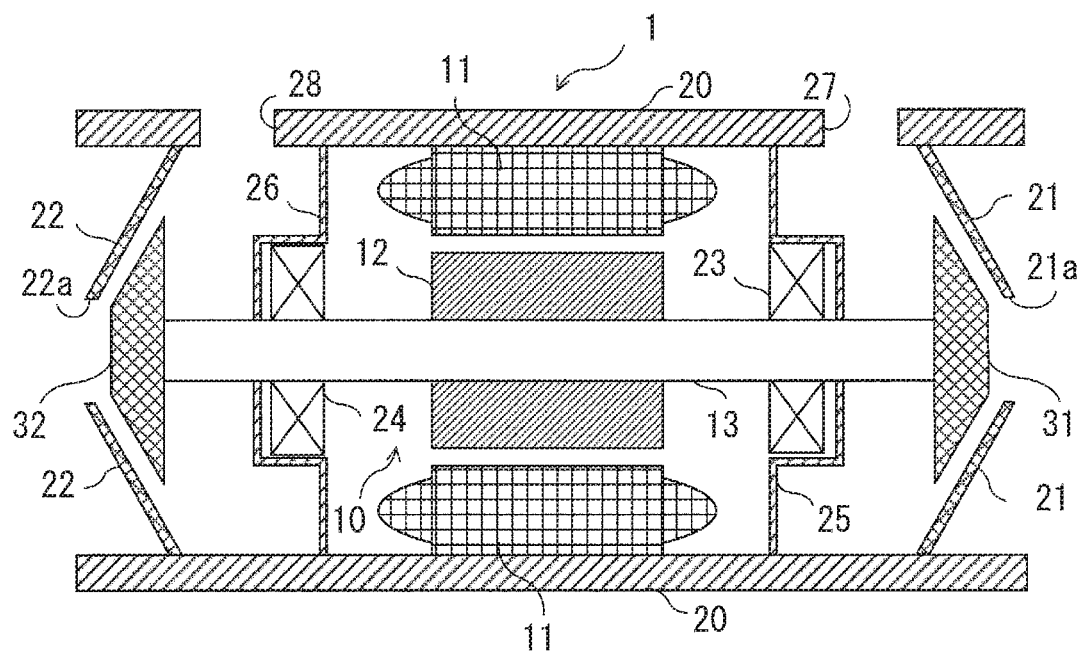
FIG. 1 is a diagram showing cross-sectional structure of a configuration example of an electric blower according to a first embodiment of the present invention.
Figure 2:
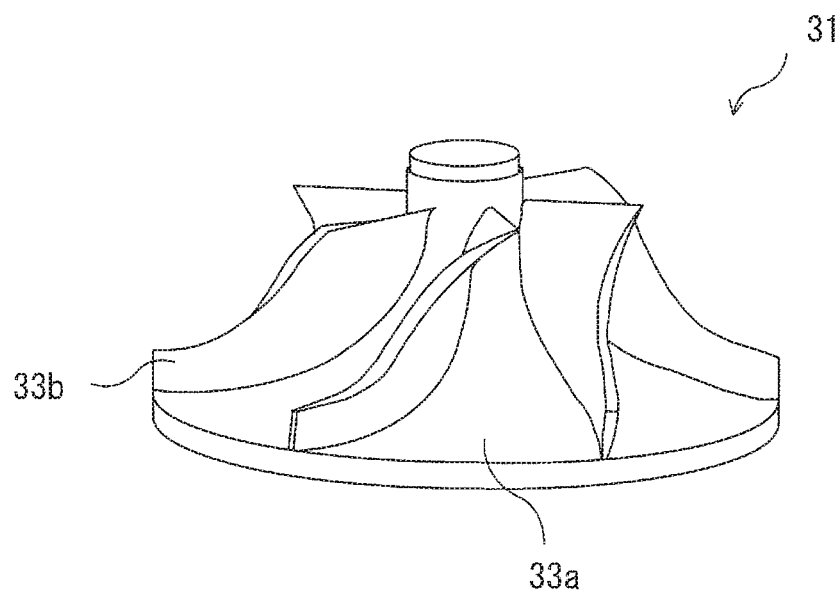
FIG. 2 is a perspective view showing a configuration example of a first centrifugal fan in the electric blower shown in FIG. 1.
Figure 3:
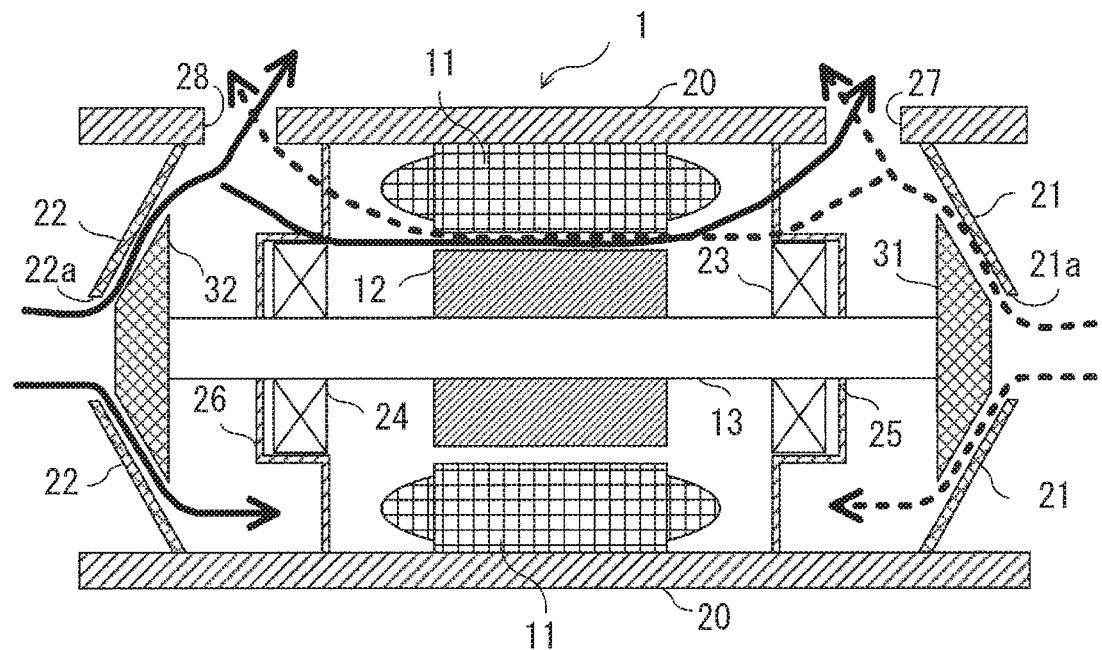
FIG. 3 is a diagram schematically showing air currents in the electric blower shown in FIG. 1.

An electric blower according to a first embodiment of the present invention will be described below with reference to FIG. 1 to FIG. 10. FIG. 1 is a diagram showing cross-sectional structure of a configuration example of the electric blower according to the first embodiment, FIG. 2 is a perspective view showing a configuration example of a first centrifugal fan in the electric blower 1 shown in FIG. 1, and FIG. 3 is a diagram schematically showing air currents in the electric blower 1 shown in FIG. 1. Incidentally, while a condition of air currents is indicated by broken line arrows and solid line arrows in FIG. 3, the arrows in FIG. 3 just roughly indicate an example of air currents; the same applies to the subsequent drawings in which similar broken line arrows and solid line arrows are drawn.

As shown in FIG. 1, the electric blower 1 according to the first embodiment includes a motor 10 having a rotary shaft 13, a first centrifugal fan 31 fixed to a first end side of the rotary shaft 13, a second centrifugal fan 32 fixed to a second end side of the rotary shaft 13 opposite to the first end side, and a casing (housing) 20.

The motor 10 can include, for example, a stator 11 and a rotor 14 provided inside the stator 11 and having the rotary shaft 13 and a rotor core 12 fixed to the rotary shaft 13. Incidentally, the rotor 14 is formed by fixing the rotary shaft 13 to a shaft hole formed through a central part of the rotor core 12, for example. The motor 10 is configured so that the rotor 14 rotates with respect to the stator 11 around the rotary shaft 13 as a rotation axis. Further, although not illustrated, the electric blower 1 includes a drive circuit, a power supply, electric wiring, etc. for driving the motor 10.

As shown in FIG. 1, the first centrifugal fan 31 can be fixed to a first end (right-hand end in FIG. 1) of the rotary shaft 13 and the second centrifugal fan 32 can be fixed to a second end (left-hand end in FIG. 1) of the rotary shaft 13. However, it is also possible to fix the first centrifugal fan 31 while having the right-hand end of the rotary shaft 13 protrude from the first centrifugal fan 31, or to fix the second centrifugal fan 32 while having the left-hand end of the rotary shaft 13 protrude from the second centrifugal fan 32. When the first centrifugal fan 31 or the second centrifugal fan 32 is described below without discriminating between them, the first centrifugal fan 31 or the second centrifugal fan 32 will be referred to simply as a centrifugal fan 31, 32.

The centrifugal fan 31, 32 is a fan having a shape capable of generating an air current having a component (centrifugal direction component) in a direction orthogonal to an axial direction parallel to the rotation axis (i.e., axial direction of rotation) at the time of rotation, which can be referred to also as a radial flow fan, a multiblade fan, a turbo fan, or the like. Specifically, the first centrifugal fan 31 can have a shape shown in FIG. 2, for example, in which a plurality of blades 33b are provided on a basal part (base) 33a to which the rotary shaft 13 is attached. When these blades 33b are rotated, an air current including at least a centrifugal direction component is generated. Incidentally, the blades 33b can be referred to as centrifugal blades. In the following description, the axial direction of rotation can be referred to simply as an "axial direction".

The second centrifugal fan 32 can also have a shape similar to the first centrifugal fan 31. Both of the first and second centrifugal fans 31 and 32 rotate around the rotary shaft 13 as a common rotation axis, and thus when the first centrifugal fan 31 has the shape shown in FIG. 2, for example, it can be considered that the second centrifugal fan 32 is desired to have a shape obtained by horizontally inverting the first centrifugal fan 31 in an axisymmetric manner on the sheet of FIG. 2 from the viewpoint of successfully generating an equivalent amount of air current. Incidentally, the centrifugal fan 31, 32 can be either a fan having forward blades or a fan having backward blades, and specifically, the centrifugal fans 31 and 32 can be formed to have blades in the same direction as viewed in the state before being attached to the rotary shaft 13, e.g., formed totally in the same shape.

Further, while the shape of the centrifugal fan 31, 32 is specified mainly by the shape, number, etc. of the blades of the centrifugal fan 31, 32, any shape can be employed as long as an air current including a centrifugal direction component can be generated at the time of rotation as mentioned above. Thus, the centrifugal fan 31, 32 can be formed as a diagonal flow fan that generates an air current including a centrifugal direction component and a component parallel to the axial direction (axial direction component). Therefore, the concept of the centrifugal fan described here includes diagonal flow fans. Incidentally, the centrifugal fan 31, 32 can be regarded as a type of rotor vane since a plurality of blades forming a vane make a rotary motion.

The casing 20 is a member surrounding the motor 10, the first centrifugal fan 31 and the second centrifugal fan 32, e.g., a member surrounding the motor 10, the first centrifugal fan 31 and the second centrifugal fan 32 at least around the rotation axis of the rotary shaft 13 as shown in FIG. 1. The stator 11 can be fixed to an inner wall of the casing 20, for example.

Further, the casing 20 has at least one opening part (referred to as a third opening part for convenience) provided between the first centrifugal fan 31 and the second centrifugal fan 32 to serve as a passage port for an air current. The third opening part, as an opening part formed through the casing 20, can be referred to as a casing opening part. The third opening part can be formed as two opening parts 27 and 28 as shown in FIG. 1, for example.

Here, the passage port for an air current means either a gas outlet or a gas inlet, and is a gas outlet in the first embodiment. Thus, the third opening parts 27 and 28 in the electric blower 1 serve as gas outlets (opening parts situated on a downstream side of the air current) as shown in FIG. 1 and FIG. 3. Further, while the gas is generally air, the gas is not limited to air; the gas can also be a particular type of gas. Incidentally, as mentioned earlier, the third opening parts 27 and 28 mean opening parts different from a first opening part 21a and a second opening part 22a in FIG. 1 and FIG. 3 which will be described later.

The third opening part 27 can be formed at an axial direction position between the rotor core 12 and the first centrifugal fan 31, specifically, at an axial direction position between the first centrifugal fan 31 and a first support member 25 (or a first bearing 23) which will be described later. The third opening part 28 can be formed at an axial direction position between the rotor core 12 and the second centrifugal fan 32, specifically, at an axial direction position between the second centrifugal fan 32 and a second support member 26 (or a second bearing 24) which will be described later.

Further, the casing 20 can have the first opening part 21a and the second opening part 22a as shown in FIG. 1. The first opening part 21a is an opening part formed on the first end side of the casing 20, while the second opening part 22a is an opening part formed on the second end side of the casing 20. The first opening part 21a is capable of making an air current generated by the first centrifugal fan 31 pass through, while the second opening part 22a is capable of making an air current generated by the second centrifugal fan 32 pass through. When the first opening part 21a or the second opening part 22a is described below without discriminating between them, the first opening part 21a or the second opening part 22a will be referred to simply as an opening part 21a, 22a. While the opening parts 21a and 22a can be referred to as casing opening parts similarly to the third opening parts 27 and 28, the opening parts 21a and 22a can be referred to also as cover opening parts.

Furthermore, as shown in FIG. 1, the casing 20 can include a first fan cover 21 having the first opening part 21a and directing the centrifugal direction air current generated by the first centrifugal fan 31 in the axial direction. The first fan cover 21 serves as a cover that covers a part of the first centrifugal fan 31 (a part excluding at least the first opening part 21a). Moreover, as shown in FIG. 1, the casing 20 can include a second fan cover 22 having the second opening part 22a and directing the centrifugal direction air current generated by the second centrifugal fan in the axial direction. The second fan cover 22 serves as a cover that covers a part of the second centrifugal fan 32 (a part excluding at least the second opening part 22a). Incidentally, even when the casing 20 is configured to have no obliquely arranged cover like the first fan cover 21 and the second fan cover 22, it is permissible if the casing 20 has the first opening part 21a and the second opening part 22a. When the first fan cover 21 or the second fan cover 22 is described below without discriminating between them, the first fan cover 21 or the second fan cover 22 will be referred to simply as a fan cover 21, 22.

As shown in FIG. 3, the first fan cover 21 has the first opening part 21a as a port for sucking in gas, as well as an inclined surface (first inclined surface) against which the air current generated in the centrifugal direction by the first centrifugal fan 31 (discharged gas) collides. Depending on such a configuration and the positional relationship with the first centrifugal fan 31, the first fan cover 21 functions as a wind direction modification member (wind direction adjustment modification plate) that causes the gas sucked in through the first opening part 21a by the rotation of the first centrifugal fan 31 to flow in the centrifugal direction and changes the direction of the air current (wind direction) at the aforementioned first inclined surface. Like an air current indicated by a broken line arrow in FIG. 3, the aforementioned first inclined surface in this example is capable of redirecting the air current into a direction heading towards the rotor core 12's side, that is, changing the air current to include an axial direction component.

Further, as shown in FIG. 1, the first fan cover 21 can have a cylindrical shape centering at the rotation axis of the rotary shaft 13 such that the diameter (inner diameter, outer diameter) decreases with the increase in the distance from the rotor core 12. However, the shape of the first fan cover 21 is not limited to this example. Incidentally, the first fan cover 21 does not cover the first centrifugal fan 31 at least in the first opening part 21a. Furthermore, the first fan cover 21 can be fixed to an inner circumferential wall of a main body of the casing 20 as shown in FIG. 1, for example.

As shown in FIG. 3, similarly to the first fan cover 21, the second fan cover 22 has the second opening part 22a as a port for sucking in gas, as well as an inclined surface (second inclined surface) against which the air current generated in the centrifugal direction by the second centrifugal fan 32 collides, and functions as a wind direction modification member. Like an air current indicated by a solid line arrow in FIG. 3, the aforementioned second inclined surface in this example is capable of redirecting the air current to head towards the rotor core 12's side. As shown in FIG. 1, the second fan cover 22 can also have a cylindrical shape centering at the rotation axis of the rotary shaft 13 such that the diameter decreases with the increase in the distance from the rotor core 12 similarly to the first fan cover 21. However, the shape of the second fan cover 22 is not limited to this example. Incidentally, the second fan cover 22 does not cover the second centrifugal fan 32 at least in the second opening part 22a. Furthermore, the second fan cover 22 can also be fixed to the inner circumferential wall of the main body of the casing 20 similarly to the first fan cover 21, for example.

Incidentally, in a case where the first centrifugal fan 31 is a diagonal flow fan, the diagonal flow fan at the time of rotation is capable of independently generating an air current including the axial direction component; however, the casing 20 can have the first fan cover 21 also in this case. A case where the second centrifugal fan 32 is a diagonal flow fan can be explained similarly to the case of the first centrifugal fan 31.

Further, as shown in FIG. 1, the electric blower 1 can include the first bearing 23, the second bearing 24, the first support member (first bearing support member) 25 and the second support member (second bearing support member) 26. When the first bearing 23 or the second bearing 24 is described below without discriminating between them, the first bearing 23 or the second bearing 24 will be referred to simply as a bearing 23, 24. Similarly, when the first support member 25 or the second support member 26 is described below without discriminating between them, the first support member 25 or the second support member 26 will be referred to simply as a support member 25, 26.

The first bearing 23, as a bearing rotatably supporting the rotary shaft 13 on the first end side, can be arranged at a position between the first centrifugal fan 31 and the rotor core 12 as shown in FIG. 1. The first support member 25 is fixed inside the casing 20 and supports the first bearing 23. The second bearing 24, as a bearing rotatably supporting the rotary shaft 13 on the second end side, can be arranged at a position between the second centrifugal fan 32 and the rotor core 12 as shown in FIG. 1. The second support member 26 is fixed inside the casing 20 and supports the second bearing 24.

Figure 4:
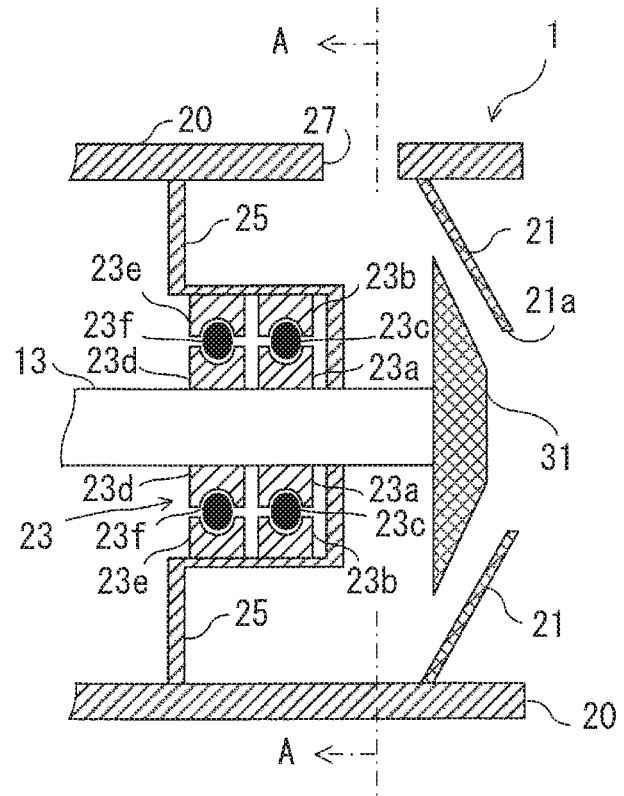
FIG. 4 is a diagram showing an example of a first bearing and a first support member in the electric blower shown in FIG. 1.
Figure 5:
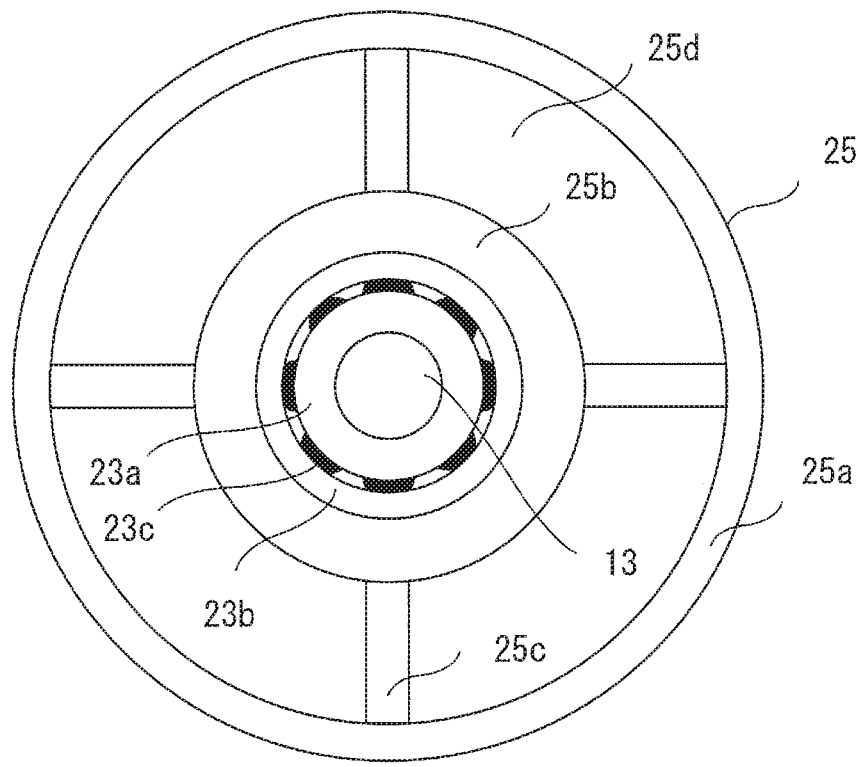
FIG. 5 is a top view showing the first support member shown in FIG. 4.
Figure 6:
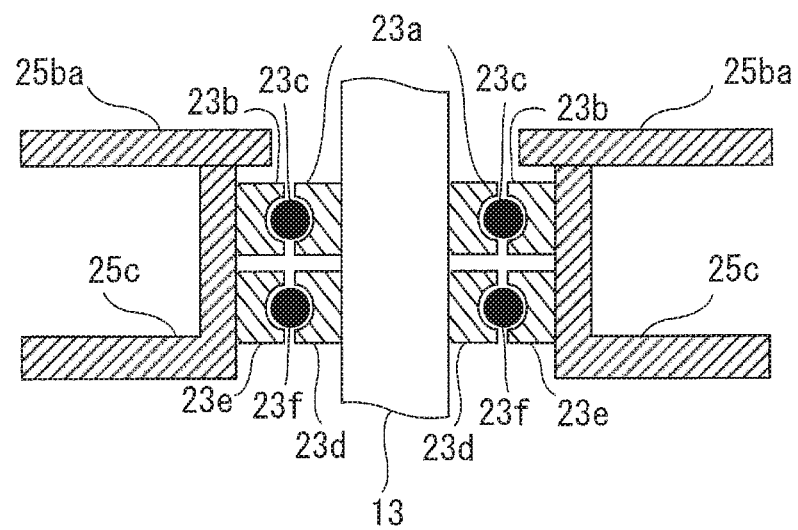
FIG. 6 is a cross-sectional view showing another configuration example of the first support member in the electric blower shown in FIG. 1.

The bearing 23, 24 and the support member 25, 26 will be explained below referring also to FIG. 4 to FIG. 6. FIG. 4 is a diagram showing an example of the first bearing 23 and the first support member 25, FIG. 5 is a top view showing the first support member 25 shown in FIG. 4 viewed from the line A-A in FIG. 4, and FIG. 6 is a cross-sectional view showing another configuration example of the first support member 25.

As shown in FIG. 1 and FIG. 4, the first support member 25 can be mounted by fixing the first support member 25 to an inner wall of the casing 20. For example, the first support member 25 has a projecting part and can be fixed to the casing 20 in a state that the projecting part penetrates through a hole formed the casing 20. The method for mounting the second support member 26 in the casing 20 is similar to the method for mounting the first support member 25.

As shown in FIG. 4, the first bearing 23 can include an inner ring 23a, an outer ring 23b, and a plurality of rolling elements 23c provided between the inner ring 23a and the outer ring 23b. Here, as shown in FIG. 4, an inner circumferential side of the inner ring 23a of the first bearing 23 is fixed to the rotary shaft 13 in a range between the rotor core 12 fixed to a central part of the rotary shaft 13 and the first centrifugal fan 31 fixed to the first end side (right-hand side in FIG. 1) of the rotary shaft 13. On the other hand, an outer circumferential side of the outer ring 23b of the first bearing 23 is fixed to the first support member 25 as shown in FIG. 4.

Incidentally, while the first bearing 23 in the example shown in FIG. 4 includes a total of two bearings, namely, a bearing having the inner ring 23a, the outer ring 23b and the rolling elements 23c and a bearing having an inner ring 23d, an outer ring 23e and rolling elements 23f, to hold the rotary shaft 13 while preventing an inclination of the rotary shaft 13, the number of bearings is not limited to this example.

Although not illustrated, the second bearing 24 can include an inner ring, an outer ring, and a plurality of rolling elements provided between the inner ring and the outer ring similarly to the first bearing 23. The method for fixing the second bearing 24 to the rotary shaft 13 and the second support member 26 is also similar to the method for fixing the first bearing 23 to the rotary shaft 13 and the first support member 25. Namely, an inner circumferential side of the inner ring of the second bearing 24 is fixed to the rotary shaft 13 in a range between the rotor core 12 and the second centrifugal fan 32, and an outer circumferential side of the outer ring of the second bearing 24 is fixed to the second support member 26.

By attaching the first bearing 23 to the rotary shaft 13 and the first support member 25 and attaching the second bearing 24 to the rotary shaft 13 and the second support member 26 as above, the rotary shaft 13 and the rotor core 12 fixed to the rotary shaft 13 are made to be rotatable with respect to the first support member 25, the second support member 26 and the casing 20 to which the first support member 25 and the second support member 26 are fixed, that is, rotatable with respect to the stator 11 fixed to the casing 20.

Further, the first support member 25 can include a fourth opening part 25d as shown in FIG. 5. The fourth opening part 25d is an opening part inside the casing 20 and can be referred to as an internal opening part. The fourth opening part 25d can be formed as a communication hole establishing communication between a space on the rotor core 12's side of the first support member 25 and a space on the first centrifugal fan 31's side of the first support member 25. The first support member 25 shown in FIG. 5 includes an annular part 25a for the fixation to the inner wall of the casing 20, a central part 25b for the fixation to the outer rings 23b and 23e of the first bearing 23, and a plurality of branch parts 25c connecting the annular part 25a and the central part 25b together. The fourth opening part 25d is formed between adjacent branch parts 25c. In this example, four branch parts 25c are provided, and thus the number of fourth opening parts 25d is four. The number of communication holes provided in the first support member 25 as the fourth opening parts is not limited to two or more but can also be one.

Even when a configuration including the fourth opening parts is employed, the first support member 25 is not limited to the above-described shape; the first support member 25 may also be formed in a shape without the annular part 25a and with tip ends of the branch parts 25c directly fixed to the inner wall of the casing 20, for example. More specifically, as shown in FIG. 6, the first support member 25 can have a shape obtained by removing the annular part 25a from the first support member 25 shown in FIG. 4 and FIG. 5, leaving the branch parts 25c without change, and providing the central part 25b with an attachment part 25ba formed to have branch parts similar to the branch parts 25c. In the example shown in FIG. 6, tip ends of the branch parts of the attachment part 25ba and the tip ends of the branch parts 25c, at an axial direction position shifted from that of the tip ends of the branch parts of the attachment part 25ba, can be fixed to the inner wall of the casing 20, and thus the first support member 25 can be firmly fixed to the casing 20.

Further, although not illustrated, the second support member 26 can have an internal opening part (referred to as a "fifth opening part") similarly to the first support member 25. The fifth opening part can be formed as a communication hole establishing communication between a space on the rotor core 12's side of the second support member 26 and a space on the second centrifugal fan 32's side of the second support member 26, for example. The number of communication holes provided in the second support member 26 as the fifth opening parts is also not limited to two or more but can be one. When the fourth opening part or the fifth opening part is described below without discriminating between them, the fourth opening part or the fifth opening part will be referred to simply as a communication hole (communication hole formed through the support member 25, 26).

By having the first support member 25 with the fourth opening part and having the second support member 26 with the fifth opening part, heat radiation of the motor 10 can be promoted (assisted), heat radiation of the first bearing 23 can be promoted (assisted) not only from the first centrifugal fan 31's side but also from the motor 10's side, and heat radiation of the second bearing 24 can be promoted (assisted) not only from the second centrifugal fan 32's side but also from the motor 10's side. In reality, windings of the motor 10 emit heat when the motor is energized, the bearings 23 and 24 rotatably supporting the rotary shaft 13 also emit heat due to friction when the rotary shaft 13 rotates, and both of the motor 10 and the bearings 23 and 24 can be in danger of a shortened operating life and a decrease in reliability due to the heating. However, the aforementioned promotion of heat radiation improves the reliability of the motor 10 and the bearings 23 and 24 and extends the operating life.

Incidentally, the heat radiation of the first bearing 23 from the first centrifugal fan 31's side is implemented by the air current from the first centrifugal fan 31's side making contact with the first bearing 23, and the heat radiation of the second bearing 24 from the second centrifugal fan 32's side is implemented by the air current from the second centrifugal fan 32's side making contact with the second bearing 24. The heat radiation of the first bearing 23 can be promoted by allowing an air current to flow between the first bearing 23 and the rotary shaft 13 from one end to the other end in the axial direction. Similarly, the heat radiation of the second bearing 24 can be promoted by allowing an air current to flow between the second bearing 24 and the rotary shaft 13 from one end to the other end in the axial direction.

Figure 7:
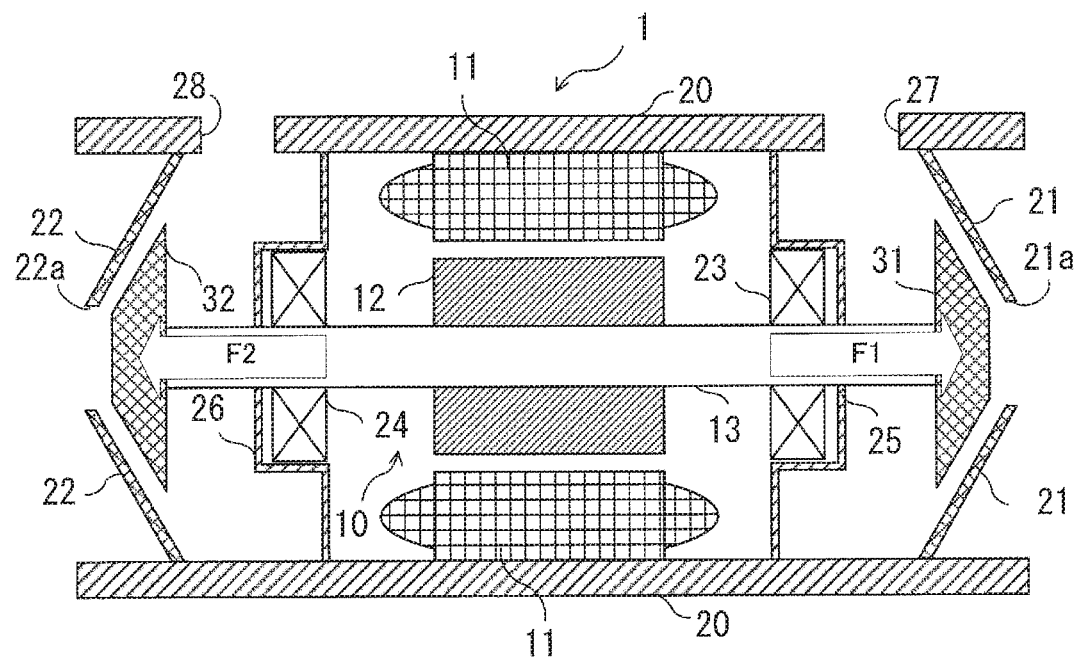
FIG. 7 is a diagram showing directions of axial direction force applied to a rotary shaft in the electric blower shown in FIG. 1.

Next, principal features of the electric blower 1 shown in FIG. 1 will be described below by referring also to FIG. 7. FIG. 7 is a diagram showing directions of axial direction force applied to the rotary shaft 13 in the electric blower 1 shown in FIG. 1.

In the first embodiment, during the rotation of the rotary shaft 13, first force F1 applied by the first centrifugal fan 31 to the rotary shaft 13 in a first direction and second force F2 applied by the second centrifugal fan 32 to the rotary shaft 13 in a second direction are opposite to each other as shown in FIG. 7. Here, the first direction and the second direction are directions opposite to each other though each of them is the axial direction of the rotary shaft 13. In other words, in the first embodiment, the first force F1 applied by the first centrifugal fan 31 to the rotary shaft 13 in the axial direction and the second force F2 applied by the second centrifugal fan 32 to the rotary shaft 13 in the axial direction are in directions opposite to each other. Incidentally, each of the first force F1 and the second force F2 represents force acting in the axial direction of the rotary shaft 13 and is referred to also as thrust force or a thrust load.

The first force F1 and second force F2 occur as counteraction when the first centrifugal fan 31 and the second centrifugal fan 32 fixed to both ends of the rotary shaft 13 suck in gas (from the outside to the inside of the casing 20 in the first embodiment shown in FIG. 3) at the time of rotation. Thus, it means that there is the following relationship between the aforementioned first force F1 and the second force F2: the directions of the air currents sucked in by the first centrifugal fan 31 and the second centrifugal fan 32 are opposite to each other in the axial direction (directions symmetrical to each other). By configuring the electric blower 1 so that the aforementioned relationship is established between the first force F1 and the second force F2 satisfy the aforementioned relationship, thrust forces in directions annihilating each other (canceling each other) can be applied to the rotary shaft 13, as the rotary shaft of the first centrifugal fan 31 and the second centrifugal fan 32, from both sides, by which the force balance in the electric blower 1 in the axial direction can be improved (force in the axial direction can be reduced).

When a thrust load acts on the rotary shaft 13, friction among the inner ring 23a, the outer ring 23b and the rolling elements 23c and friction among the inner ring 23d, the outer ring 23e and the rolling elements 23f in the first bearing 23 shown in FIG. 4 increase and it can cause these components to wear out. The same applies to the second bearing 24. However, in the first embodiment, the thrust load acting on the rotary shaft 13 is reduced, by which the amount of such wear can be reduced and the operating life of the first bearing 23 and the second bearing 24 can be extended.

While making the first force F1 and the second force F2 be forces in directions opposite to each other can be realized by configuring the electric blower 1 so that both of the centrifugal fans 31 and 32 suck in gas from the outside to the inside of the casing 20 as the air currents indicated by broken line arrows and solid line arrows in FIG. 3, the relationship can be realized also in an electric blower in which both of the first centrifugal fan and the second centrifugal fan suck gas from the inside of the casing 20 and discharge the gas to the outside. The former case is described in the first embodiment, while the latter case will be described later as an eighth embodiment.

In the electric blower 1 of the first embodiment corresponding to the former case, the first force F1 is force heading from the second end side (end on the side where the second centrifugal fan 32 is attached) towards the first end side (end on the side where the first centrifugal fan 31 is attached) of the rotary shaft 13, and the second force F2 is force heading from the first end side towards the second end side of the rotary shaft 13. Namely, in the electric blower 1, the first direction is the direction heading from the second end side towards the first end side and the second direction is the direction heading from the first end side towards the second end side.

Further, the electric blower 1 sucks in gas through the opening parts 21a and 22a of the fan covers 21 and 22 by using the centrifugal fans 31 and 32 as the air currents indicated by broken line arrows and solid line arrows in FIG. 3, and emits (discharges) the gas through the opening parts 27 and 28. Therefore, the electric blower 1 can be installed in electric equipment used for the purpose of blowing out air, by connecting pipes having air blow ports or the like to the opening parts 27 and 28, for example. However, the electric blower 1 can also be installed in electric equipment used for the purpose of suction by connecting pipes having suction ports or the like to the opening parts 21a and 22a, for example.

Incidentally, in a case of employing structure in which a part of the air currents passes through the motor 10, it is desirable to provide a filter or the like on the outside of the casing 20 (the opening parts 27 and 28 or the pipes or the like connected to the opening parts 27 and 28, or the opening parts 21a and 22a or the pipes or the like connected to the opening parts 21a and 22a) to prevent accumulation of dust in the motor 10.

Further, the first force F1 and the second force F2 are desired to balance with each other (equal in magnitude). This makes it possible to eliminate the force in the axial direction of the electric blower 1 accompanying the rotation of the centrifugal fans 31 and 32 and precisely maintain the balance in the axial direction. Here, the first force F1 and the second force F2 may be balanced with each other by designing the shapes and arrangement of the centrifugal fans 31 and 32 and the fan covers 21 and 22 so that the air current generated by the first centrifugal fan 31 and the air current generated by the second centrifugal fan 32 are plane-symmetrical to each other with respect to a plane at the intermediate position between the first centrifugal fan 31 and the second centrifugal fan 32 and orthogonal to the axial direction. Even if the first force F1 and the second force F2 are not precisely balanced with each other, similar effects are achieved as long as the first force F1 and the second force F2 are substantially balanced with each other.

(1-2) Modifications

Figure 8:
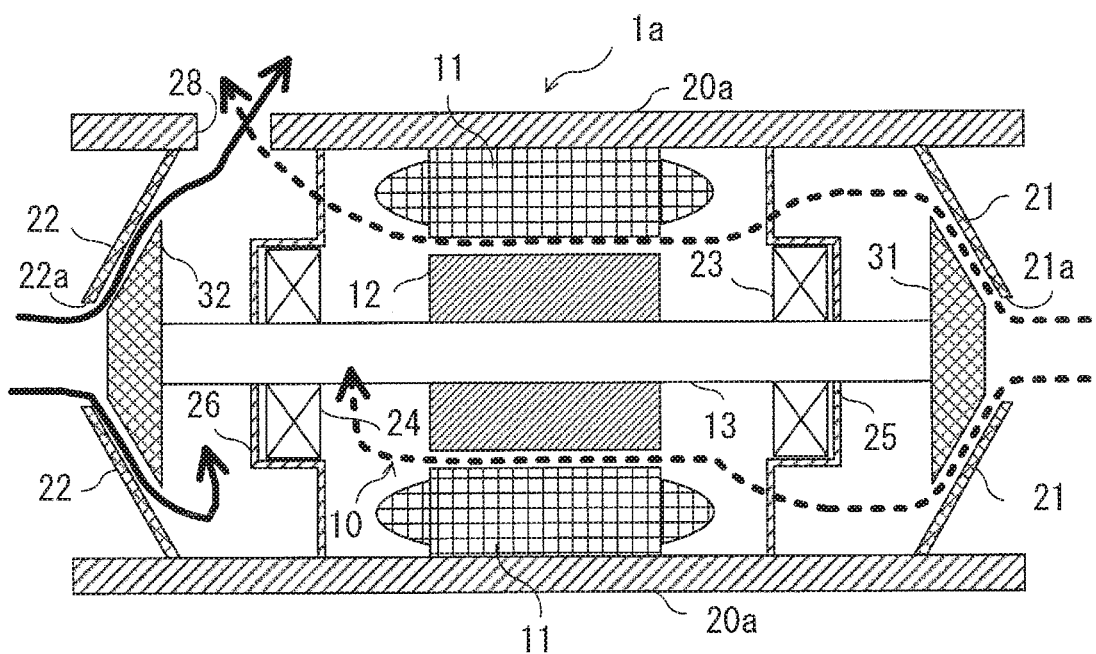
FIG. 8 is a diagram showing cross-sectional structure of another configuration example of the electric blower according to the first embodiment.
Figure 9:
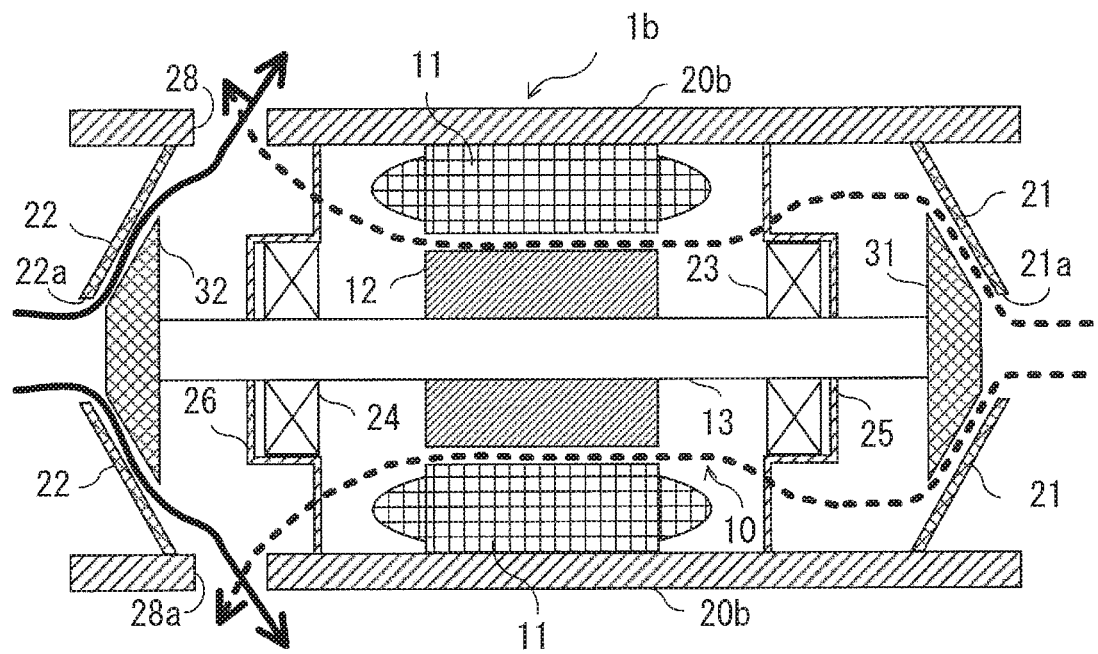
FIG. 9 is a diagram showing cross-sectional structure of another configuration example of the electric blower according to the first embodiment.
Figure 10:
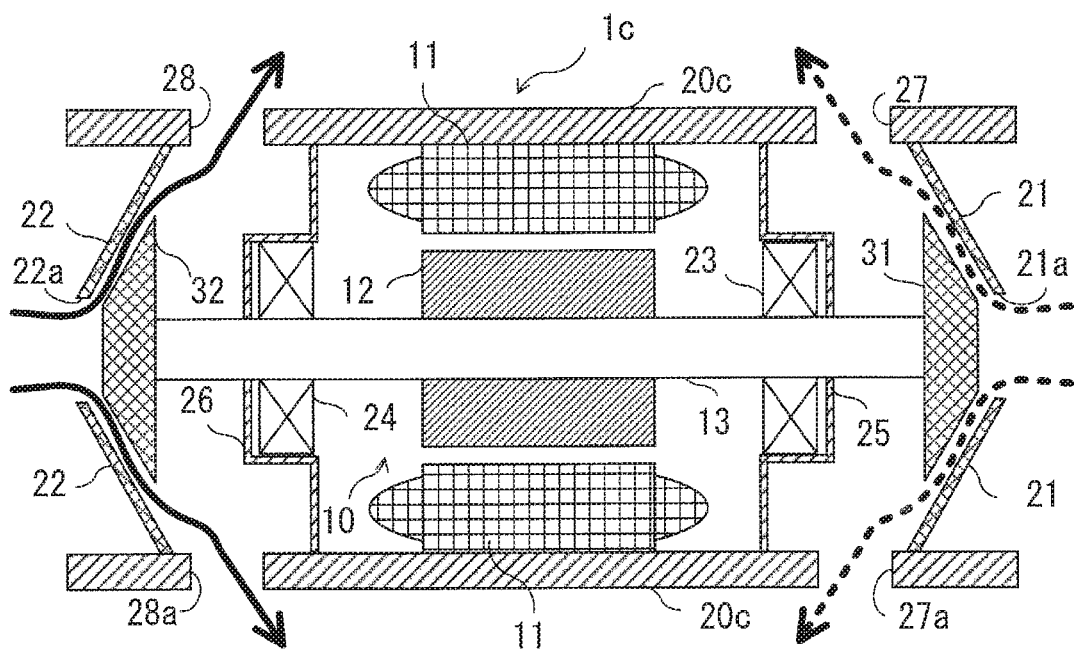
FIG. 10 is a diagram showing cross-sectional structure of another configuration example of the electric blower according to the first embodiment.

Modifications of the electric blower according to the first embodiment will be described below with reference to FIG. 8 to FIG. 10. FIG. 8 to FIG. 10 are diagrams showing cross-sectional structure of other configuration examples of the electric blower according to the first embodiment that are different from each other. In FIG. 8 to FIG. 10, each part identical to or having a function corresponding to a part shown in FIG. 1 is assigned the same reference character as that used in FIG. 1.

An electric blower 1a shown in FIG. 8 has a casing 20a having no opening part 27 (i.e., not provided with the opening part 27) instead of the casing 20 of the electric blower 1 shown in FIG. 1. In the electric blower 1a, each of the first support member 25 and the second support member 26 is assumed to be provided with the communication hole, and gas sucked in by the first centrifugal fan 31 passes through the inside of the motor 10 and is discharged through the opening part 28 as indicated by a broken line arrow in FIG. 8. Further, as indicated by a solid line arrow in FIG. 8, gas sucked in by the second centrifugal fan 32 is directly discharged through the opening part 28.

An electric blower 1b shown in FIG. 9 has a casing 20b, obtained by providing the casing 20a with a new third opening part 28a, instead of the casing 20a of the electric blower 1a shown in FIG. 8. In the electric blower 1b, each of the first support member 25 and the second support member 26 is assumed to be provided with the communication hole, and gas sucked in by the first centrifugal fan 31 passes through the inside of the motor 10 and is discharged through the opening parts 28 and 28a as indicated by broken line arrows in FIG. 9. Further, as indicated by solid line arrows in FIG. 9, gas sucked in by the second centrifugal fan 32 is directly discharged through the opening parts 28 and 28a. Incidentally, while the axial direction positions of the opening part 28 and the opening part 28a are equal to each other as shown in FIG. 9, it is permissible as long as the axial direction positions of the opening part 28 and the opening part 28a are between the second centrifugal fan 32 and the second support member 26. In the casing 20b, the number of third opening parts provided at such intermediate axial direction positions is not limited to two but can be three or more; however, it is desirable to evenly arrange the third opening parts on a circle centering at the rotary shaft 13.

An electric blower 1c shown in FIG. 10 has a casing 20c, obtained by providing the casing 20 with new third opening parts 27a and 28a, instead of the casing 20 of the electric blower 1 shown in FIG. 1. In the electric blower 1c, the first support member 25 and the second support member 26 may either be provided with the communication hole or no communication hole. In the electric blower 1c, gas sucked in by the first centrifugal fan 31 is directly discharged through the opening parts 27 and 27a as indicated by broken line arrows in FIG. 10. In cases where the communication hole is provided, part of the gas passes through the inside of the motor 10 and is discharged also through the opening parts 28 and 28a. Similarly, in the electric blower 1c, gas sucked in by the second centrifugal fan 32 is directly discharged through the opening parts 28 and 28a as indicated by solid line arrows in FIG. 10. In cases where the communication hole is provided, part of the gas passes through the inside of the motor 10 and is discharged also through the opening parts 27 and 27a.

Incidentally, the axial direction positions of the opening parts 28 and 28a and the number and arrangement of the opening parts provided at these positions are as described earlier with reference to FIG. 9. Explanations similar to those of the opening parts 28 and 28a can be invoked also for the opening parts 27 and 27a. Namely, while the axial direction positions of the opening part 27 and the opening part 27a are equal to each other as shown in FIG. 10, it is permissible as long as the axial direction positions of the opening part 27 and the opening part 27a are between the first centrifugal fan 31 and the first support member 25. In the casing 20c, the number of opening parts provided at such intermediate axial direction positions is not limited to two but can be three or more; however, it is desirable to evenly arrange the opening parts on a circle centering at the rotary shaft 13.

(1-3) Effect

With the electric blowers 1, 1a, 1b and 1c according to the first embodiment, forces in directions annihilating each other (canceling each other) can be applied to the rotary shaft 13, as the rotary shaft of the first centrifugal fan 31 and the second centrifugal fan 32, from both sides by the air currents generated by the first centrifugal fan 31 and the second centrifugal fan 32 at the time of rotation, and therefore the force in the axial direction in the electric blowers 1, 1*a*, 1*b* and 1*c* can be reduced. Further, since such force in the axial direction can be reduced by the first embodiment, it becomes possible in an electric blower to proactively employ centrifugal fans in order to increase the static pressure, or to employ centrifugal fans of high static pressure.

In the electric blower 1, 1*a*, 1*b*, 1*c*, the first force F1 is set as force heading from the second end towards the first end of the rotary shaft 13 and the second force F2 is set as force heading from the first end towards the second end of the rotary shaft 13, and thus the electric blower can be installed in electric equipment used for the purpose of blowing out air by connecting pipes having air blow ports or the like to the opening parts 27 and 28, for example, and can also be installed in electric equipment used for the purpose of suction by connecting pipes having suction ports or the like to the opening parts 21*a* and 22*a*, for example.

The casing 20, 20*a*, 20*b*, 20*c* can include a first opening part 21*a* provided on the first end side of the casing 20 and a second opening part 22*a* provided on the second end side of the casing 20. With the electric blower 1, 1*a*, 1*b*, 1*c*, thanks to the opening parts 21*a* and 22*a*, the air current generated by the first centrifugal fan 31 can be made to flow through the first opening part 21*a* and the air current generated by the second centrifugal fan 32 can be made to flow through the second opening part 22*a*.

The casing 20, 20*a*, 20*b*, 20*c* can include the first fan cover 21 having the first opening part 21*a* and directing the centrifugal direction air current generated by the first centrifugal fan 31 in the axial direction and the second fan cover 22 having the second opening part 22*a* and directing the centrifugal direction air current generated by the second centrifugal fan 32 in the axial direction. The electric blower 1, 1*a*, 1*b*, 1*c* includes the fan covers 21 and 22, thereby the gas sucked in through the first opening part 21*a* by the rotation of the first centrifugal fan 31 can be made to flow in the centrifugal direction and the direction of the air current (wind direction) can be changed, and the gas sucked in through the second opening part 22*a* by the rotation of the second centrifugal fan 32 can be made to flow in the centrifugal direction and the direction of the air current (wind direction) can be changed.

The electric blower 1, 1*a*, 1*b*, 1*c* includes the first bearing 23, the second bearing 24, the first support member 25 and the second support member 26, thereby making it possible to reduce the thrust load working on the bearing 23, 24 in conjunction with the thrust load working on the rotary shaft 13 due to the rotation of the centrifugal fan 31, 32, to prevent the wear of the bearing 23, 24, and to extend the operating life.

By forming the communication holes through the first support member 25 and the second support member 26 and allowing gas to flow to the inside of the motor 10, the heat radiation of the motor 10 can be promoted, the heat radiation of the first bearing 23 can also be promoted not only from the centrifugal fan 31's side but also from the motor 10's side, and the heat radiation of the second bearing 24 can also be promoted not only from the centrifugal fan 32's side but also from the motor 10's side. Accordingly, it is expected that each of the motor 10 and the bearings 23 and 24 improves the reliability and extends the operating life.

By keeping the first force F1 and the second force F2 balanced with each other, thrust forces working on the rotary shaft 13 as the rotary shaft of the first centrifugal fan 31 and the second centrifugal fan 32 due to the air currents generated by the first centrifugal fan 31 and the second centrifugal fan 32 at the time of rotation can be made to annihilate each other (cancel each other) and the force in the axial direction in the electric blower 1, 1*a*, 1*b*, 1*c* accompanying the rotation of the centrifugal fans 31 and 32 can be eliminated. Further, this can eliminate the thrust load acting on each bearing 23, 24 accompanying the rotation of the centrifugal fans 31 and 32 and can extend the operating life of the bearings 23 and 24, for example.

(2) Second Embodiment (2-1) Configuration

Figure 11:
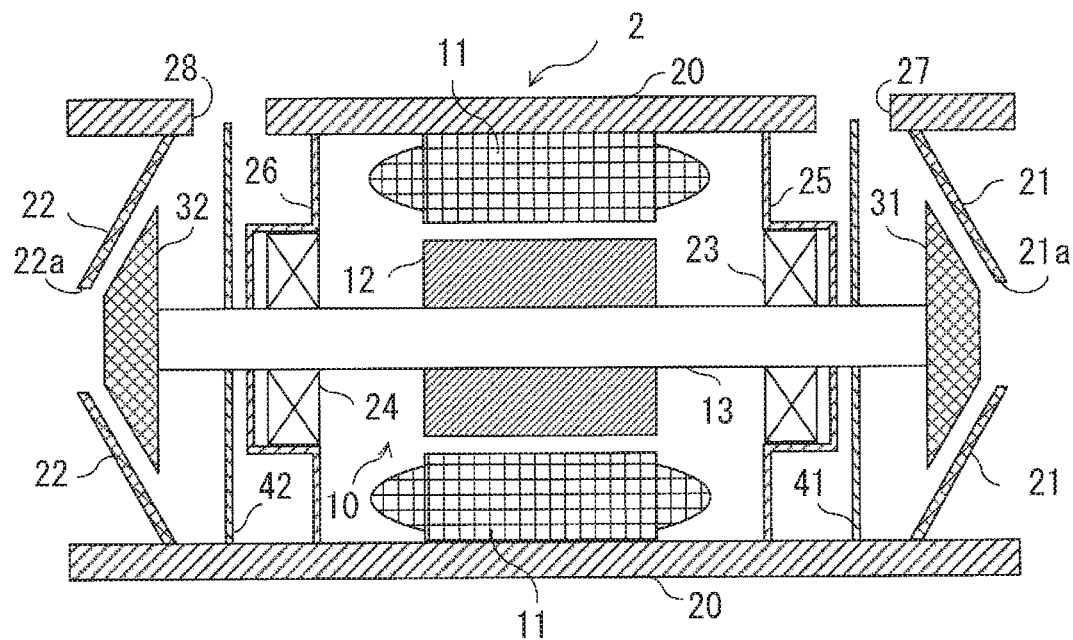
FIG. 11 is a diagram showing cross-sectional structure of a configuration example of an electric blower according to a second embodiment.
Figure 12:
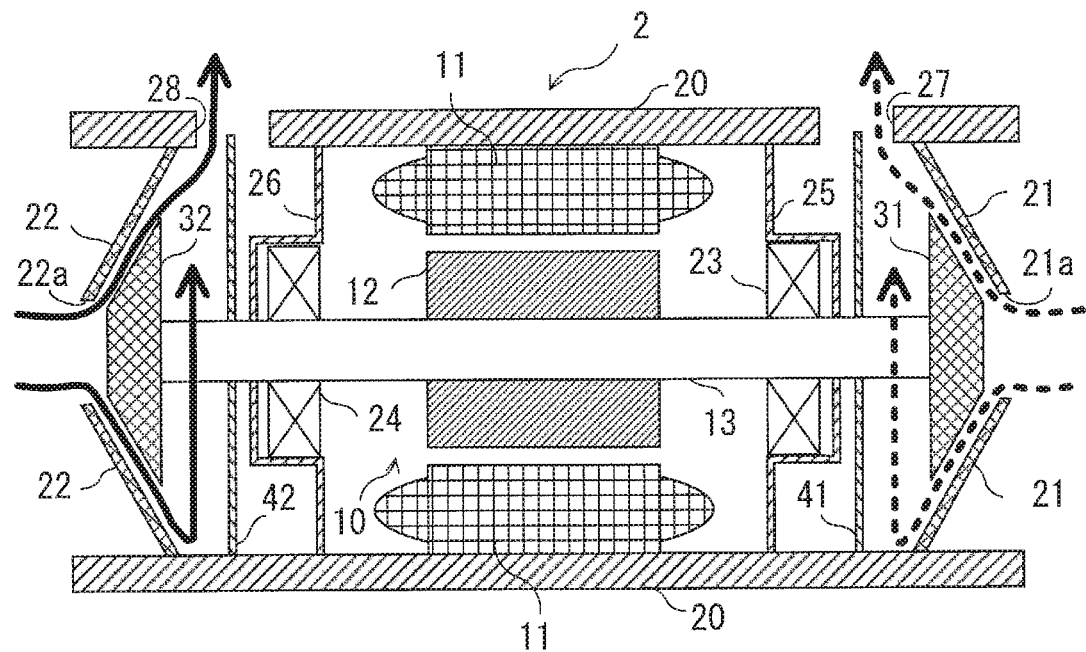
FIG. 12 is a diagram schematically showing air currents in the electric blower shown in FIG. 11.

An electric blower according to a second embodiment will be described below with reference to FIG. 11 to FIG. 16. FIG. 11 is a diagram showing cross-sectional structure of a configuration example of the electric blower according to the second embodiment, and FIG. 12 is a diagram schematically showing air currents in the electric blower 2 shown in FIG. 11. In FIG. 11 to FIG. 16, each part identical to or having a function corresponding to a part shown in FIG. 1 is assigned the same reference character as in FIG. 1. While the following description of the second embodiment will be given on the difference from the first embodiment, various examples excluding the difference from the first embodiment can be employed in the second embodiment.

In the first embodiment, examples have been described in which the communication holes are formed through the support members 25 and 26 shown in FIG. 1 and the heat radiation of the motor 10 and the bearings 23 and 24 can be promoted by the air currents generated by the centrifugal fans 31 and 32. Also in the second embodiment, the description will be given basically on the assumption that the support members 25 and 26 are provided with the communication holes for the purpose of promoting the heat radiation of the motor 10; however, it is permissible even if no communication holes are provided.

As shown in FIG. 11, the electric blower 2 according to the second embodiment further includes a first partition part 41 compared to the electric blower 1 shown in FIG. 1. The first partition part 41 is fixed in the casing 20 and changes the direction of the air current generated by the first centrifugal fan 31 at a position between the first centrifugal fan 31 and the first support member 25. Thus, the first partition part 41 is arranged between the first centrifugal fan 31 and the first bearing 23 (namely, between the first centrifugal fan 31 and the first support member 25) in the axial direction as shown in FIG. 11. While the shape of the first partition part 41 is not particularly limited, it can be considered that a plate-like shape like the one shown in FIG. 11 is desirable from the viewpoint of simple structure.

With the first partition part 41, a space on the side where the first centrifugal fan 31 is fixed and a space on the side where the second centrifugal fan 32 is fixed can be divided from each other in the casing 20. Namely, the first partition part 41 serves to divide the air current generated by the first centrifugal fan 31 and the air current generated by the second centrifugal fan 32 from each other so as to prevent the air currents from colliding (merging) with each other. Incidentally, the first partition part 41 has a communication hole for making the rotary shaft 13 pass through.

The first partition part 41 can be arranged to at least partially overlap with the third opening part 27 in terms of the axial direction position. Namely, the third opening part 27 can be provided in a first range in the axial direction at least partially overlapping with a first arrangement range where the first partition part 41 is arranged. FIG. 11 shows an example in which the third opening part 27 and the first partition part 41 are arranged so that a central position of the third opening part 27 in the axial direction and a central position of the first partition part 41 in the axial direction coincide with each other. In the electric blower 2, gas channels connecting the opening part 21a of the first fan cover 21 and the third opening part 27 are formed as it can be known from the air currents indicated by broken line arrows in FIG. 12.

As shown in FIG. 11, the first partition part 41 is desired to extend to the position of the third opening part 27 or to the vicinity of the position in a radial direction (direction orthogonal to the axial direction). With such a configuration, the collision of air currents can be avoided all the way to the third opening part 27 as a gas discharge port. Incidentally, while the air current discharged through the third opening part 27 is formed of an air current generated by the first centrifugal fan 31 and an air current generated by the second centrifugal fan 32 merging together, pressure loss due to the merging is small since the two air currents merge together while being directed substantially in the same direction thanks to the first partition part 41 extending to the third opening part 27.

In a configuration in which the first partition part 41 does not extend to the position of the third opening part 27 in the radial direction, when there exists an air current generated by the second centrifugal fan 32 and passing through the communication holes of the support members 25 and 26, the air current and the air current generated by the first centrifugal fan 31 merge together before being discharged through the third opening part 27. However, since the arrangement ranges of the first partition part 41 and the third opening part 27 in the axial direction overlap with each other, the two air currents merge together while being directed in the same direction along the first partition part 41 and the pressure loss due to the merging is small.

Further, as shown in FIG. 11, the electric blower 2 can include a second partition part 42 arranged on the second centrifugal fan 32's side and similar in shape to the first partition part 41. However, the first partition part 41 and the second partition part 42 may also differ from each other in shape. The second partition part 42 is fixed in the casing 20 and changes the direction of the air current generated by the second centrifugal fan 32 at a position between the second centrifugal fan 32 and the second support member 26. Thus, the second partition part 42 is arranged between the second centrifugal fan 32 and the second bearing 24 (namely, between the second centrifugal fan 32 and the second support member 26) in the axial direction as shown in FIG. 11. Also with the second partition part 42, a space on the side where the first centrifugal fan 31 is fixed and a space on the side where the second centrifugal fan 32 is fixed can be divided from each other in the casing 20.

The second partition part 42 can be arranged to at least partially overlap with the third opening part 28 in terms of the axial direction position. Namely, the third opening part 28 can be provided at a second range in the axial direction at least partially overlapping with a second arrangement range where the second partition part 42 is arranged. FIG. 11 shows an example in which the third opening part 28 and the second partition part 42 are arranged so that a central position of the third opening part 28 in the axial direction and a central position of the second partition part 42 in the axial direction coincide with each other. In the electric blower 2, gas channels connecting the opening part 22a of the second fan cover 22 and the third opening part 28 are formed as it can be known from the air currents indicated by solid line arrows in FIG. 12.

As shown in FIG. 11, the second partition part 42 is desired to extend to the position of the third opening part 28 or to the vicinity of the position in the radial direction. With such a configuration, the collision of air currents can be avoided all the way to the third opening part 28 as a gas discharge port. Incidentally, in the air current discharged through the third opening part 28, the pressure loss due to the merging is small for the same reason as in the air current discharged through the third opening part 27.

In a configuration in which the second partition part 42 does not extend to the position of the third opening part 28 in the radial direction, suppose there exists an air current generated by the first centrifugal fan 31 and passing through the support members 25 and 26, the air current and the air current generated by the second centrifugal fan 32 merge together before being discharged through the third opening part 28. However, since the arrangement ranges of the second partition part 42 and the third opening part 28 in the axial direction overlap with each other, the two air currents merge together while being directed in the same direction along the second partition part 42 and the pressure loss due to the merging is small.

In the electric blower 2 according to the second embodiment, thanks to the above-described configuration, the air current generated by the first centrifugal fan 31 can be guided like the air currents indicated by the broken line arrows in FIG. 12 and the air current generated by the second centrifugal fan 32 can be guided like the air currents indicated by the solid line arrows in FIG. 12 in the casing 20, by which the collision of air currents from both sides can be inhibited. Thus, with the electric blower 2 including the first partition part 41 and the second partition part 42, the pressure loss due to the collision and mixing of air currents can be reduced and aerodynamic efficiency can be increased in comparison with a case where the first partition part 41 and the second partition part 42 are not provided.

(2-2) Modifications

Figure 13:
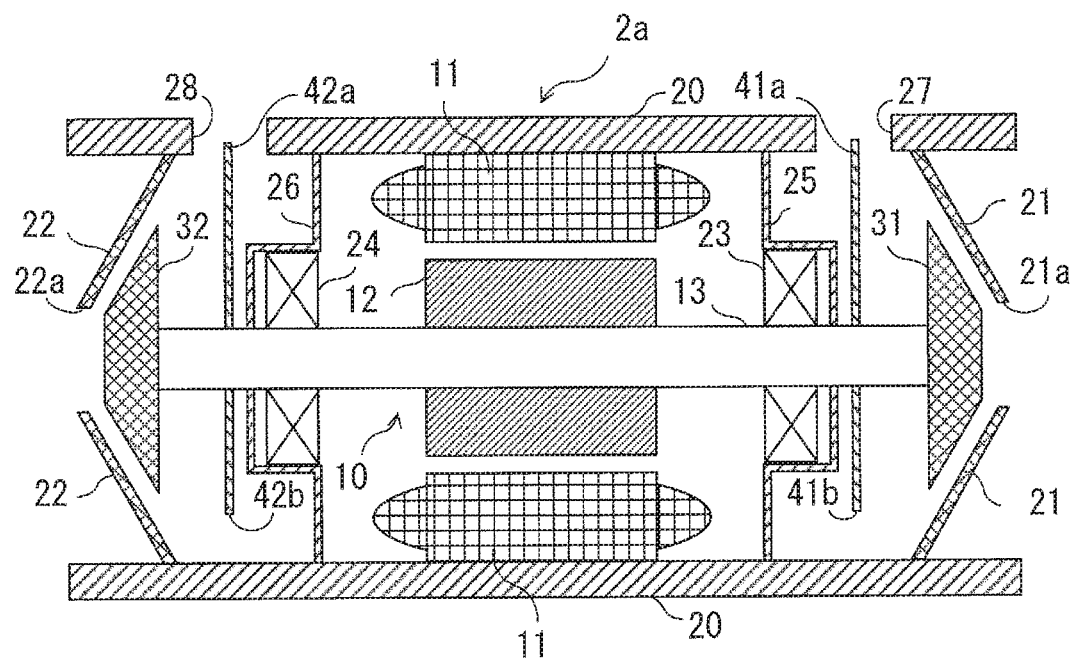
FIG. 13 is a diagram showing cross-sectional structure of another configuration example of the electric blower according to the second embodiment.
Figure 14:
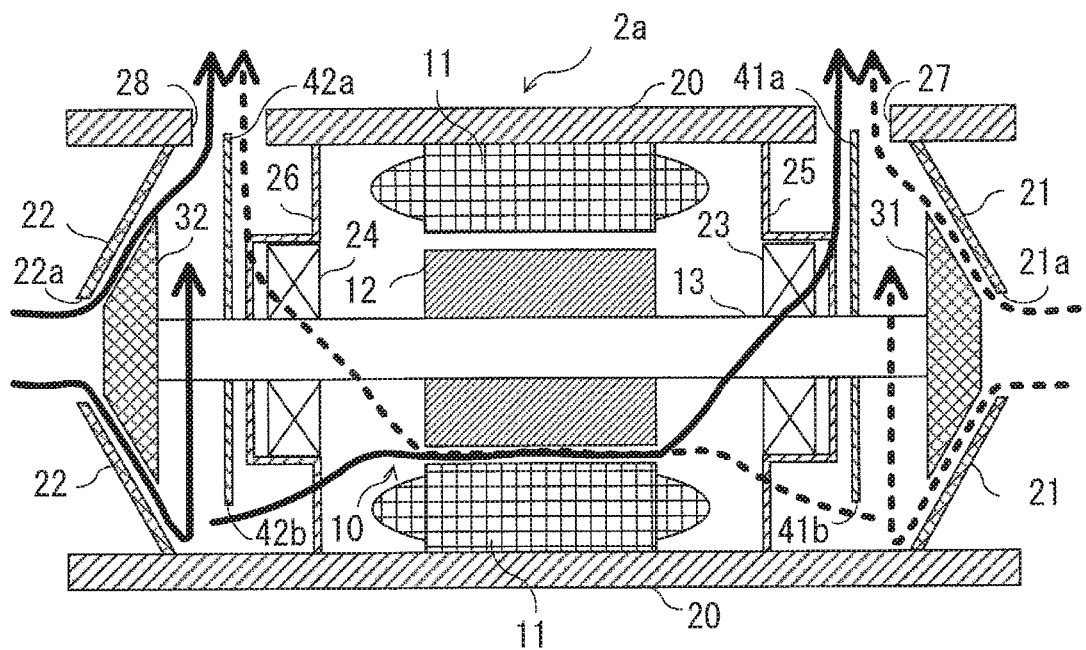
FIG. 14 is a diagram schematically showing air currents in the electric blower shown in FIG. 13.
Figure 15:
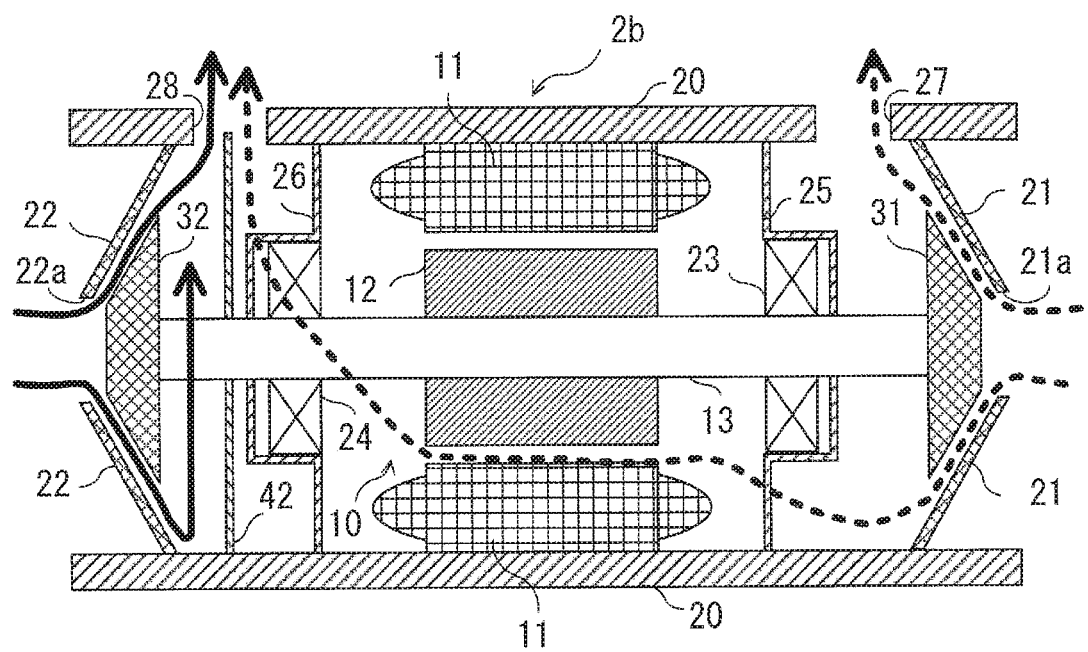
FIG. 15 is a diagram showing cross-sectional structure of another configuration example of the electric blower according to the second embodiment.
Figure 16:
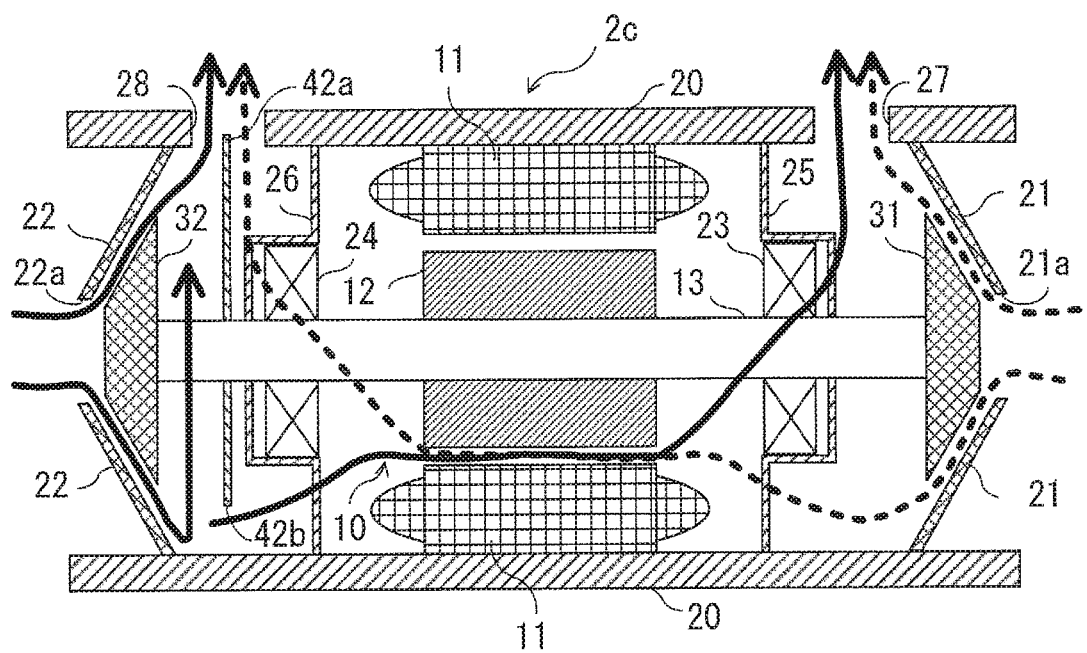
FIG. 16 is a diagram showing cross-sectional structure of another configuration example of the electric blower according to the second embodiment.

Modifications of the electric blower according to the second embodiment will be described below with reference to FIG. 13 to FIG. 16. FIG. 13, FIG. 15 and FIG. 16 are diagrams showing cross-sectional structure of other configuration examples of the electric blower according to the second embodiment that are different from each other. FIG. 14 is a diagram schematically showing air currents in the electric blower shown in FIG. 13. In FIG. 13 to FIG. 16, each part identical to or having a function corresponding to a part shown in FIG. 11 is assigned the same reference character as that used in FIG. 11.

An electric blower 2a shown in FIG. 13 includes a first partition part 41a having a first communication hole 41b making an air current generated by the first centrifugal fan 31 pass through, instead of the first partition part 41 in the electric blower 2 shown in FIG. 11. The first communication hole 41b is a communication hole establishing communication between a space on the first centrifugal fan 31's side of the first partition part 41a and a space on the first support member 25's side of the first partition part 41a, and the first communication hole 41b can be exemplified by a circular communication hole, for example. It is also possible to form first communication holes 41b at a plurality of positions.

Further, the electric blower 2a includes a second partition part 42a having a second communication hole 42b making an air current generated by the second centrifugal fan 32 pass through, instead of the second partition part 42 in the electric blower 2 shown in FIG. 11. The second communication hole 42b is a communication hole establishing communication between a space on the second centrifugal fan 32's side of the second partition part 42a and a space on the second support member 26's side of the second partition part 42a, and the second communication hole 42b can be exemplified by a circular communication hole, for example. It is also possible to form second communication holes 42b at a plurality of positions.

The first partition part 41a allows the air current generated by the first centrifugal fan 31 to include an air current passing through the communication hole of the first support member 25, making contact with the motor 10 and promoting the heat radiation of the motor 10, thereafter passing through the communication hole of the second support member 26, and getting discharged through the third opening part 28 as indicated by a broken line arrow in FIG. 14. In this case, promoting the heat radiation of the first bearing 23 is possible by the air current passing through the first communication hole 41b, and promoting the heat radiation of the motor 10 and the bearings 23 and 24 is possible by the air current passing through the communication hole of the first support member 25.

Further, the second partition part 42a allows the air current generated by the second centrifugal fan 32 to include an air current passing through the communication hole of the second support member 26, making contact with the motor 10 and promoting the heat radiation of the motor 10, thereafter passing through the communication hole of the first support member 25, and getting discharged through the third opening part 27 as indicated by a solid line arrow in FIG. 14. In this case, promoting the heat radiation of the second bearing 24 is possible by the air current passing through the second communication hole 42b, and promoting the heat radiation of the motor 10 and the bearings 23 and 24 is possible by the air current passing through the communication hole of the second support member 26.

Further, each of the first partition part 41a and the second partition part 42a serves a function of dividing the air current generated by the first centrifugal fan 31 and the air current generated by the second centrifugal fan 32 from each other so as to prevent the air currents from partially colliding (merging) with each other. Thus, the electric blower 2a including the first partition part 41a and the second partition part 42a can reduce the pressure loss due to the collision and mixing of air currents and can improve the aerodynamic efficiency can be increased in comparison with the electric blower 1 according to the first embodiment not including the first partition part 41a and the second partition part 42a. Furthermore, as explained above, the electric blower 2a makes it possible to promote the heat radiation of the motor 10 and the bearings 23 and 24 in comparison with the electric blower 2 shown in FIG. 11.

An electric blower 2b shown in FIG. 15 is configured not to include the first partition part 41 in the electric blower 2 shown in FIG. 11. Incidentally, this configuration is practically the same as a configuration of the electric blower 2 shown in FIG. 11 without including the second partition part 42. The electric blower 2b having such a configuration allows the air current generated by the first centrifugal fan 31 to be the air currents indicated by the broken line arrows in FIG. 15 and allows the air current generated by the second centrifugal fan 32 to be the air currents indicated by the solid line arrows in FIG. 15, and therefore collision of the air currents from both sides can be prevented and the promotion of the heat radiation of the motor 10 and the bearings 23 and 24 also becomes possible. Incidentally, while air currents from both sides merge together in the third opening part 28, the pressure loss due to the merging is small since the air currents merge together while being directed substantially in the same direction thanks to the second partition part 42 as described earlier.

An electric blower 2c shown in FIG. 16 is configured not to include the first partition part 41a in the electric blower 2a shown in FIG. 13. Incidentally, this configuration is practically the same as a configuration of the electric blower 2a shown in FIG. 13 without including the second partition part 42a. The electric blower 2c having such a configuration allows the air current generated by the first centrifugal fan 31 to be the air currents indicated by the broken line arrows in FIG. 16 and allows the air current generated by the second centrifugal fan 32 to be the air currents indicated by the solid line arrows in FIG. 16, and therefore collision of the air currents from both sides can be prevented partially and the promotion of the heat radiation of the motor 10 and the bearings 23 and 24 also becomes possible. Incidentally, the merging of air currents from both sides in the third opening part 28 occurs as explained earlier.

As in the configuration examples shown in FIG. 15 and FIG. 16, the electric blower according to the second embodiment may have a configuration not including the first partition part but including the second partition part (or an opposite configuration), and a similar effect of inhibiting the collision of air currents is achieved by such a configuration in which a partition is provided beside at least one of the centrifugal fans 31 and 32 at both ends of the rotary shaft 13. However, by providing the first partition part 41 or 41a and the second partition part 42 or 42a as in the electric blower 2 or 2a shown in FIG. 11 or FIG. 13, the collision of air currents can be inhibited further, the design of the structure inside the casing 20 of the electric blower can also be made with ease with the symmetry of the first centrifugal fan 31's side and the second centrifugal fan 32's side, and the control of air currents is facilitated.

While the electric blowers 2, 2a, 2b and 2c according to the second embodiment have been described on the assumption of forming the communication hole through both of the support members 25 and 26, a configuration in which both of the support members 25 and 26 have no communication hole can also be employed. In the configuration, while the heat radiation of the motor 10 cannot be promoted, the promotion of the heat radiation of the bearings 23 and 24 is possible by forming the first communication hole 41b of the first partition part 41a and the second communication hole 42b of the second partition part 42a.

(2-3) Effects

With the electric blowers 2, 2a, 2b and 2c according to the second embodiment, the effect of reducing the force in the axial direction and the accompanying effect of reducing the wear of the bearings 23 and 24 and extending the operating life, achieved by the first embodiment, can be achieved. Further, with the electric blowers 2, 2a, 2b and 2c, the collision of the air current generated by the first centrifugal fan 31 and the air current generated by the second centrifugal fan 32 can be inhibited in the casing 20, the pressure loss due to the collision and mixing of air currents can be reduced, and the aerodynamic efficiency can be increased in comparison with a case where a partition such as the first partition part 41 is not provided. Furthermore, as shown in FIGS. 15 and 16, with the electric blowers 2b and 2c according to the second embodiment, the effect of promoting the heat radiation of the motor 10 and the bearings 23 and 24 can also be expected in addition to the above-described effects.

As shown in FIG. 13 and FIG. 14, with the electric blower 2a according to the second embodiment, thanks to the first partition part 41a having the first communication hole 41b making an air current generated by the first centrifugal fan 31 pass through, the pressure loss due to the collision and mixing of air currents can be reduced, the aerodynamic efficiency can be increased, and the heat radiation of the motor 10 and the bearings 23 and 24 can be promoted.

As shown in FIG. 11 and FIG. 13, in addition to the first partition part 41, the electric blowers 2 and 2a according to the second embodiment can further include the second partition part 42 on the second centrifugal fan 32's side fixed in the casing 20 and changing the direction of the air current generated by the second centrifugal fan 32 at a position between the second centrifugal fan 32 and the second support member 26. With the electric blowers 2 and 2a according to the second embodiment, thanks to the first partition part 41 and the second partition part 42, the collision of the air current generated by the first centrifugal fan 31 and the air current generated by the second centrifugal fan 32 can be inhibited further, the pressure loss due to the collision and mixing of air currents can be reduced further, and the aerodynamic efficiency can be increased further. Further, with the electric blowers 2 and 2a according to the second embodiment, the design of the structure inside the casing 20 can also be made with ease with the symmetry of the first centrifugal fan 31's side and the second centrifugal fan 32's side, and the control of air currents is facilitated.

As shown in FIG. 13, with the electric blower 2a according to the second embodiment, thanks to the second partition part 42a having the second communication hole 42b making an air current generated by the second centrifugal fan 32 pass through, the pressure loss due to the collision and mixing of air currents can be reduced, the aerodynamic efficiency can be increased, and the heat radiation of the motor 10 and the bearings 23 and 24 can be promoted.

Incidentally, it is also possible to achieve an effect similar to the air current collision inhibition effect achieved by the first partition part in the second embodiment, by simply not forming the communication hole through the first support member 25 and using the first support member 25 instead of the first partition part in an electric blower not including the first partition part. Similarly, it is also possible to achieve an effect similar to the air current collision inhibition effect achieved by the second partition part, by simply not forming the communication hole through the second support member 26 and using the second support member 26 instead of the second partition part in an electric blower not including the second partition part.

(3) Third Embodiment (3-1) Configuration

Figure 17:
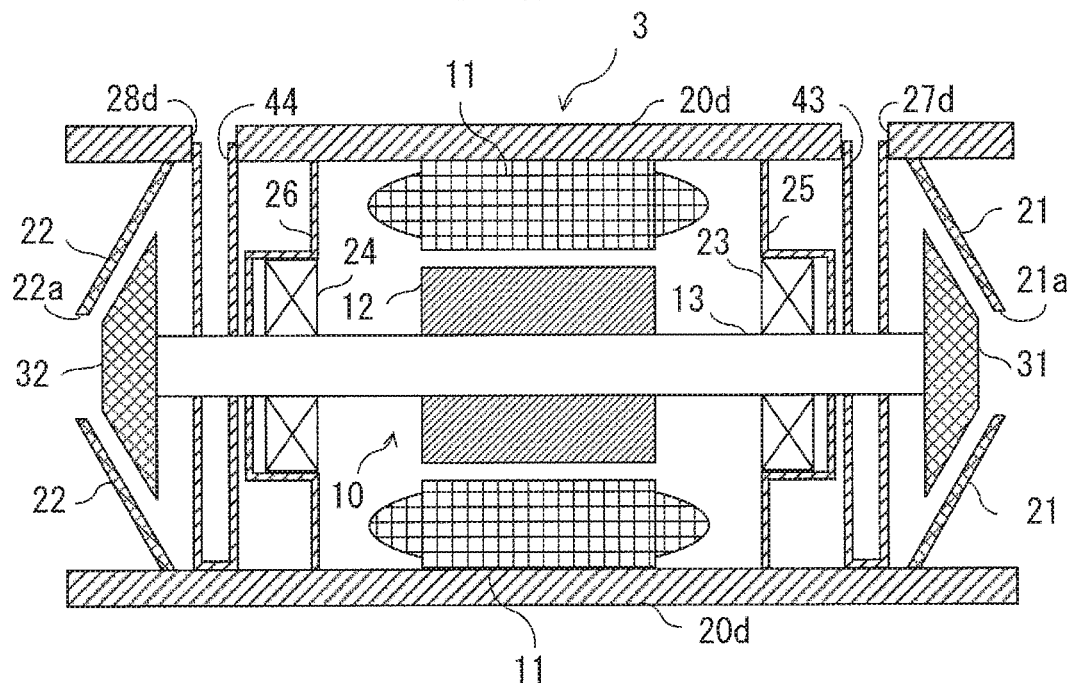
FIG. 17 is a diagram showing cross-sectional structure of a configuration example of an electric blower according to a third embodiment.
Figure 18:
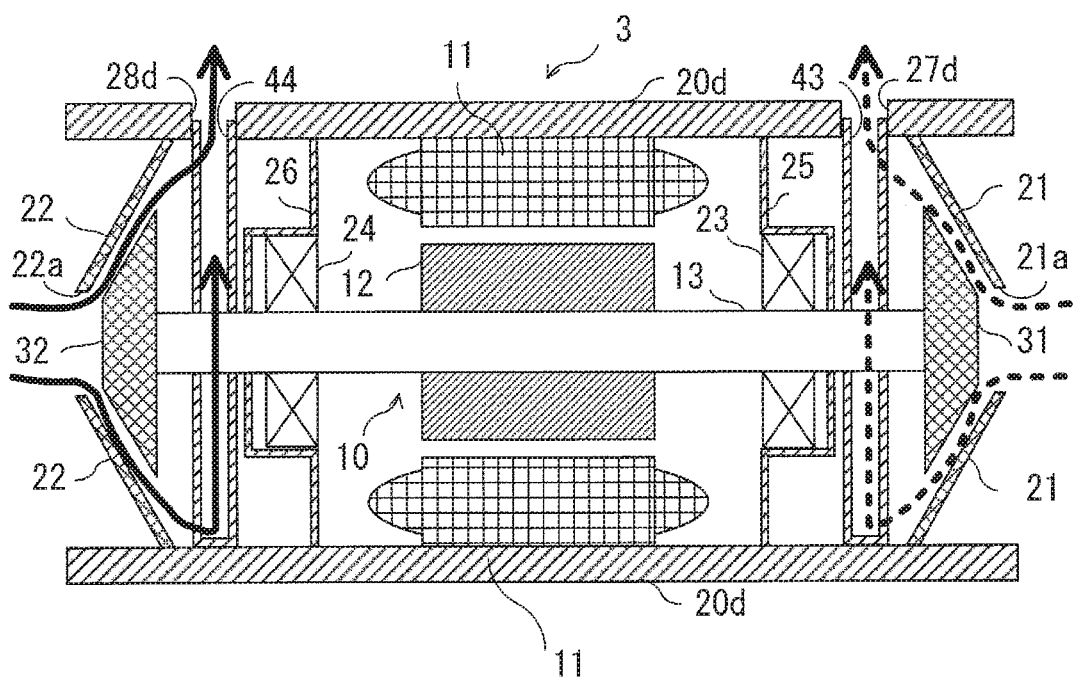
FIG. 18 is a diagram schematically showing air currents in the electric blower shown in FIG. 17.
Figure 19:
FIG. 19 is a diagram schematically showing an example of an air current in an internal casing in the electric blower shown in FIG. 17.

An electric blower according to a third embodiment will be described with reference to FIG. 17 to FIG. 21. FIG. 17 is a diagram showing cross-sectional structure of a configuration example of the electric blower according to the third embodiment, FIG. 18 is a diagram schematically showing air currents in the electric blower 3 shown in FIG. 17, and FIG. 19 is a diagram schematically showing an example of air currents in an internal casing in the electric blower 3. In FIG. 17, FIG. 18, FIG. 20 and FIG. 21, each part identical to or having a function corresponding to a part shown in FIG. 1 is assigned the same reference character as that used in FIG. 1. While the following description of the third embodiment will be given on the difference from the first and second embodiments, various examples excluding the difference from the first and second embodiments can be employed in the third embodiment.

While electric blowers including a partition like the first partition part have been described in the second embodiment while talking a plate-like partition as an example of the partition, the electric blower according to the third embodiment includes a casing capable of achieving a similar partitioning effect (referred to as an internal casing to discriminate the casing from the casing 20) instead of the plate-like partition.

As shown in FIG. 17, the electric blower 3 according to the third embodiment includes a first internal casing 43 and a second internal casing 44 instead of the first partition part 41 and the second partition part 42 in the electric blower 2 shown in FIG. 11.

The first internal casing 43 is fixed in a casing 20d and changes the direction of the air current generated by the first centrifugal fan 31 at a position between the first centrifugal fan 31 and the first support member 25 as indicated by broken line arrows in FIG. 18. The first internal casing 43 has the function of changing the direction of an air current similarly to the first partition part 41 and can be regarded as an example of the first partition part 41. Incidentally, the casing 20d is a casing having third opening parts 27d and 28d of sizes suitable for the first internal casing 43 and the second internal casing 44 instead of the third opening parts 27 and 28 shown in FIG. 1 and other drawings.

While illustrated in a simplified manner in FIG. 17 and FIG. 18, the first internal casing 43 is an internal casing having a first channel connecting the first fan cover 21 and the third opening part 27d. In the example shown in FIG. 17, the first internal casing 43 is provided so that its gas discharge port coincides with the third opening part 27d.

While the shape of the first internal casing 43 is not particularly limited, the pressure loss can be reduced further by forming the first internal casing 43 in a shape having a channel capable of controlling an air current so as to cause a spiral-shaped air current as the one shown in FIG. 19 in the channel, for example. Namely, the aforementioned first channel can be formed as a spiral-shaped channel guiding an air current as the one shown in FIG. 19, for example, and such a channel is formed inside a casing called a spiral casing, for example. Thus, the first internal casing 43 can be formed as a spiral casing, for example, and the spiral casing is capable of aggregating air currents, generated in centrifugal directions by the first centrifugal fan 31 and undergone the direction change by the first fan cover 21, into an air current pointed in one direction and discharging the air current through the third opening part 27d. Incidentally, while the first internal casing 43 can have a communication hole for making the rotary shaft 13 pass through, the first internal casing 43 can be configured so that the surface of the rotary shaft 13 does not serve as a wall forming a channel in the first internal casing 43, by employing a spiral casing, for example.

The second internal casing 44 is fixed in the casing 20d and changes the direction of the air current generated by the second centrifugal fan 32 at a position between the second centrifugal fan 32 and the second support member 26 as indicated by solid line arrows in FIG. 18. The second internal casing 44 has the function of changing the direction of an air current similarly to the second partition part 42 and can be regarded as an example of the second partition part 42.

While illustrated in a simplified manner in FIG. 17 and FIG. 18, the second internal casing 44 is an internal casing having a second channel connecting the second fan cover 22 and the third opening part 28d. In the example shown in FIG. 17, the second internal casing 44 is provided so that its gas discharge port coincides with the third opening part 28d. The above description in regard to the shape of the first internal casing 43 applies also to the shape of the second internal casing 44. Thus, the second internal casing 44 can be formed as a spiral casing, for example.

Incidentally, since the internal casing such as the first internal casing 43 or the second internal casing 44 is a casing for a fan, the internal casing can be referred to as a fan casing. Further, a combination of the internal casing and a fan cover such as the first fan cover 21 or the second fan cover 22 can be referred to as a fan casing.

As described above, by employing an internal casing as the partition part as above, the air current generated by the first centrifugal fan 31 can be guided to the third opening part 27d as indicated by the broken line arrows in FIG. 18 and the air current generated by the second centrifugal fan 32 can be guided to the third opening part 28d as indicated by the solid line arrows in FIG. 18. Consequently, with the electric blower 3, the air current generated by the first centrifugal fan 31 and the air current generated by the second centrifugal fan 32 can be efficiently separated from each other (i.e., collision of those air currents can be inhibited further) and the aerodynamic efficiency can be increased further. Incidentally, in the electric blower 3 shown in FIG. 17 and FIG. 18, the support member 25, 26 may either be provided with the communication hole or no communication hole.

Especially, by configuring the first internal casing 43 in a shape forming a channel causing a spiral-shaped air current therein, the air current generated by the first centrifugal fan 31 and changed by the first fan cover 21 is controlled efficiently (without direction change of the air current at an acute angle) from a thrust direction to a radial direction, by which the pressure loss is reduced and the aerodynamic efficiency can be increased further. Similarly to the shape of the first internal casing 43, by configuring the second internal casing 44 in a shape forming a channel causing a spiral-shaped air current therein, the air current generated by the second centrifugal fan 32 and the second fan cover 22 is controlled efficiently from a thrust direction to a radial direction, by which the pressure loss is reduced and the aerodynamic efficiency can be increased further.

(3-2) Modifications

Figure 20:
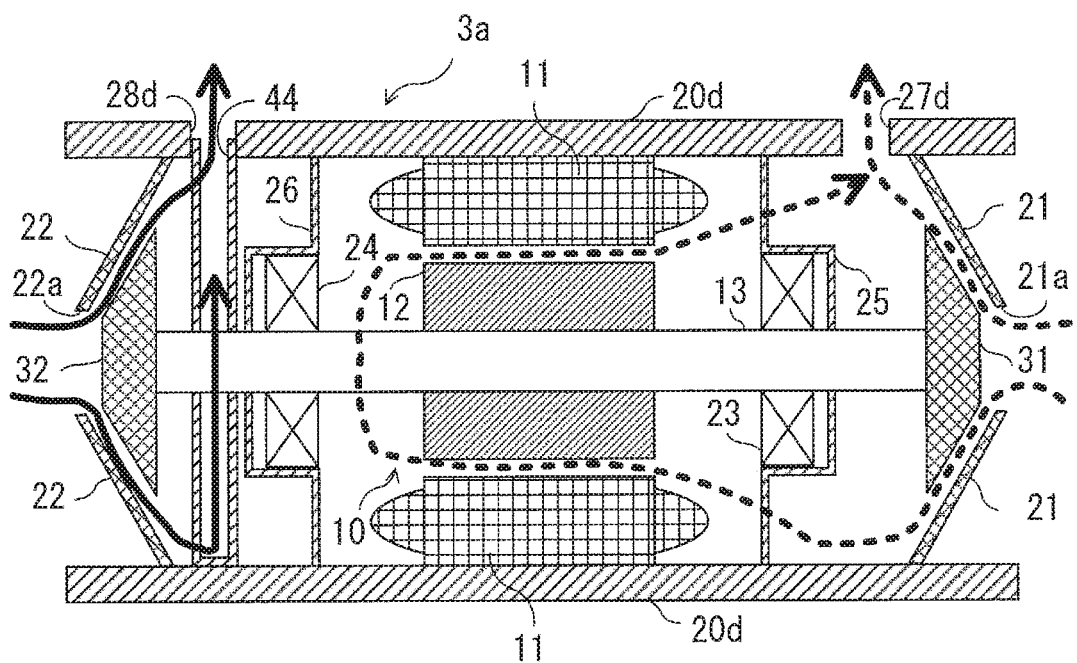
FIG. 20 is a diagram showing cross-sectional structure of another configuration example of the electric blower according to the third embodiment.
Figure 21:
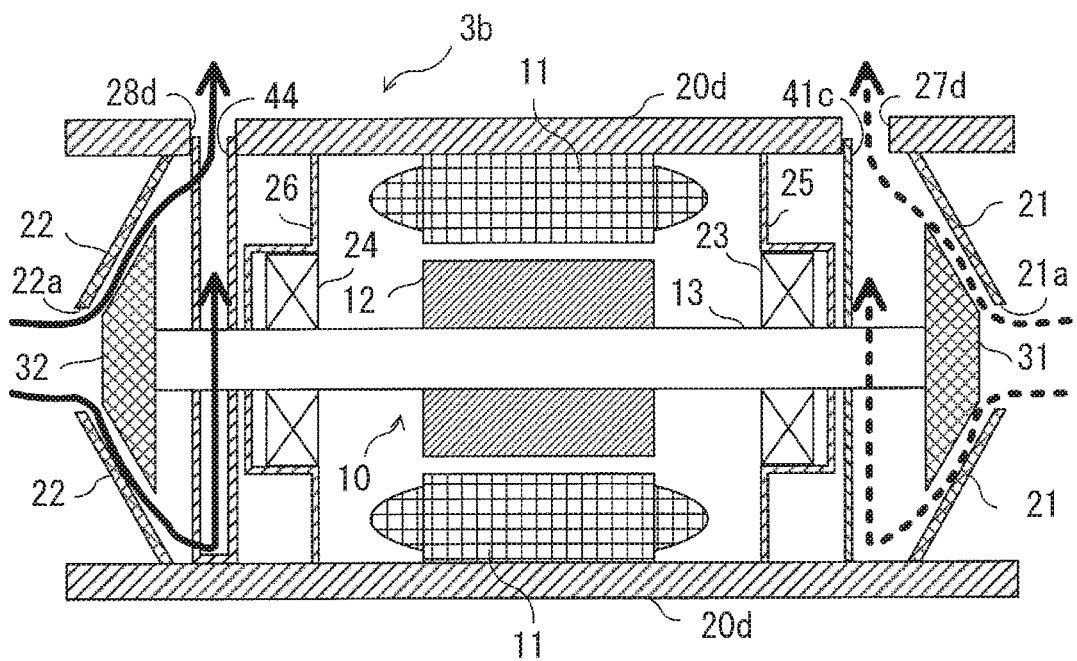
FIG. 21 is a diagram showing cross-sectional structure of another configuration example of the electric blower according to the third embodiment.

Modifications of the electric blower according to the third embodiment will be described below with reference to FIG. 20 and FIG. 21. FIG. 20 and FIG. 21 are diagrams showing cross-sectional structure of other configuration examples of the electric blower according to the third embodiment that are different from each other. In FIG. 20 and FIG. 21, each part identical to or having a function corresponding to a part shown in FIG. 17 is assigned the same reference character as that used in FIG. 17.

An electric blower 3a shown in FIG. 20 is configured not to include the first internal casing 43 in the electric blower 3 shown in FIG. 17. Incidentally, this configuration is practically the same as a configuration of the electric blower 3 shown in FIG. 17 without including the second internal casing 44. In the electric blower 3a having such a configuration, the air current generated by the first centrifugal fan 31 can be guided like the air currents indicated by the broken line arrows in FIG. 20 and the air current generated by the second centrifugal fan 32 can be guided like the air currents indicated by the solid line arrows in FIG. 20. Namely, in the electric blower 3a, the collision of these air currents can be prevented and the promotion of the heat radiation of the first bearing 23 also becomes possible. Incidentally, in the electric blower 3a shown in FIG. 20, an air current flowing to the motor 10's side like the one indicated by a broken line arrow can be caused by forming the communication hole through at least the first support member 25, and thus the promotion of the heat radiation of the motor 10 and the second bearing 24 also becomes possible.

An electric blower 3b shown in FIG. 21 includes a first partition part 41c instead of the first internal casing 43 in the electric blower 3 shown in FIG. 17. The first partition part 41c, as a plate-like partition whose axial direction position differs from that of the first partition part 41 shown in FIG. 11, is fixed to the inner wall of the casing 20d at a position where a space on the first centrifugal fan 31's side and a space on the first support member 25's side can be insulated from each other. Incidentally, this configuration is practically the same as a configuration of the electric blower 3 shown in FIG. 17 including a second partition part instead of the second internal casing 44.

In the electric blower 3b having such a configuration, the air current generated by the first centrifugal fan 31 can be guided like the air currents indicated by the broken line arrows in FIG. 21 and the air current generated by the second centrifugal fan 32 can be guided like the air currents indicated by the solid line arrows in FIG. 21, by which the collision of air currents from both sides can be prevented further. Incidentally, in the electric blower 3b shown in FIG. 21, the support member 25, 26 may either be provided with the communication hole or no communication hole.

As in the configuration examples shown in FIG. 20 and FIG. 21, the electric blower according to the third embodiment may have a configuration not including the first internal casing but including the second internal casing (or an opposite configuration), and a similar effect of inhibiting the collision of air currents is achieved by such a configuration in which an internal casing is provided beside at least one of the centrifugal fans 31 and 32 at both ends of the rotary shaft 13. However, the collision of air currents can be inhibited further by providing the internal casing or the partition in a plate-like shape or the like on both of the first centrifugal fan 31's side and the second centrifugal fan 32's side as in the electric blower 3 or 3b shown in FIG. 17 or FIG. 21.

(3-3) Effects

With the electric blowers 3, 3a and 3b according to the third embodiment, the effect of reducing the force in the axial direction and the accompanying effect of reducing the wear of the bearings 23 and 24 and extending the operating life, achieved by the first embodiment, can be achieved. Further, with the electric blowers 3, 3a and 3b, the collision of the air current generated by the first centrifugal fan 31 and the air current generated by the second centrifugal fan 32 can be inhibited in the casing 20d, the pressure loss due to the collision and mixing of air currents can be reduced, and the aerodynamic efficiency can be increased in comparison with cases where no internal casing like the first internal casing is provided. Furthermore, with the electric blowers 3, 3a and 3b, the collision of these air currents can be inhibited further and the aerodynamic efficiency can be increased further compared to cases where a plate-like partition as shown in FIG. 11 is provided.

Especially, by configuring the internal casing in a shape forming a channel causing a spiral-shaped air current therein, the pressure loss is reduced further and the aerodynamic efficiency can be increased further.

Moreover, as shown in FIG. 17, with the electric blower 3 according to the third embodiment, thanks to the first internal casing 43 and the second internal casing 44, the collision of the air current generated by the first centrifugal fan 31 and the air current generated by the second centrifugal fan 32 can be inhibited further, the pressure loss due to the collision and mixing of air currents can be reduced further, and the aerodynamic efficiency can be increased further. In addition, with the electric blower 3 according to the third embodiment, the design of the structure inside the casing 20*d* can also be made with ease with the symmetry of the first centrifugal fan 31's side and the second centrifugal fan 32's side, and the control of air currents is facilitated.

(4) Fourth Embodiment (4-1) Configuration

Figure 22:
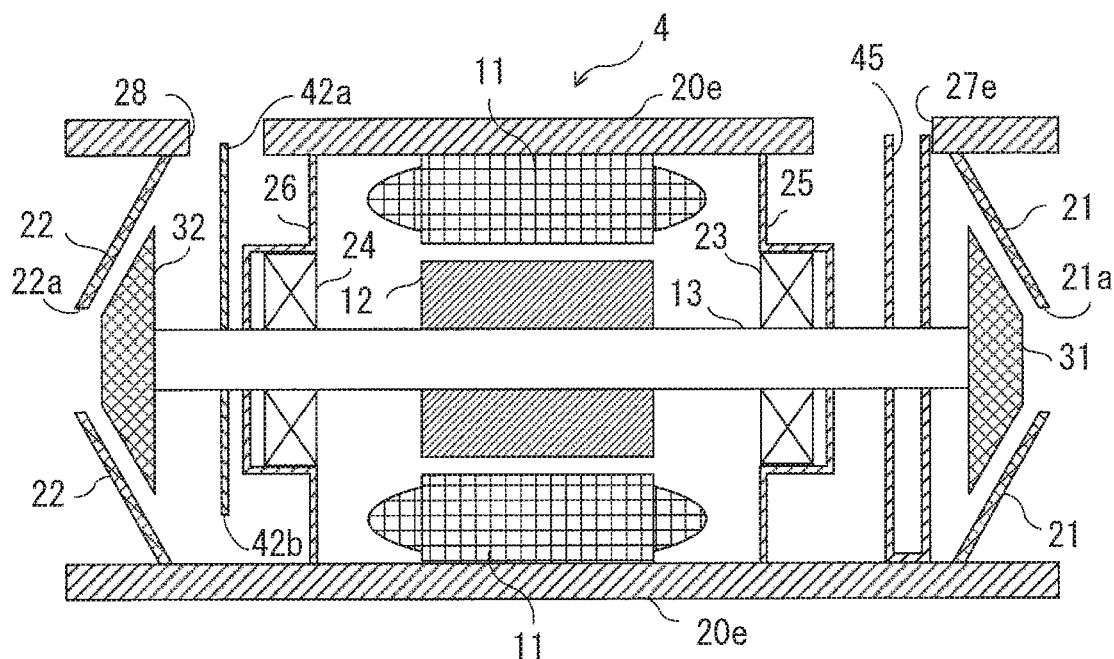
FIG. 22 is a diagram showing cross-sectional structure of a configuration example of an electric blower according to a fourth embodiment.
Figure 23:
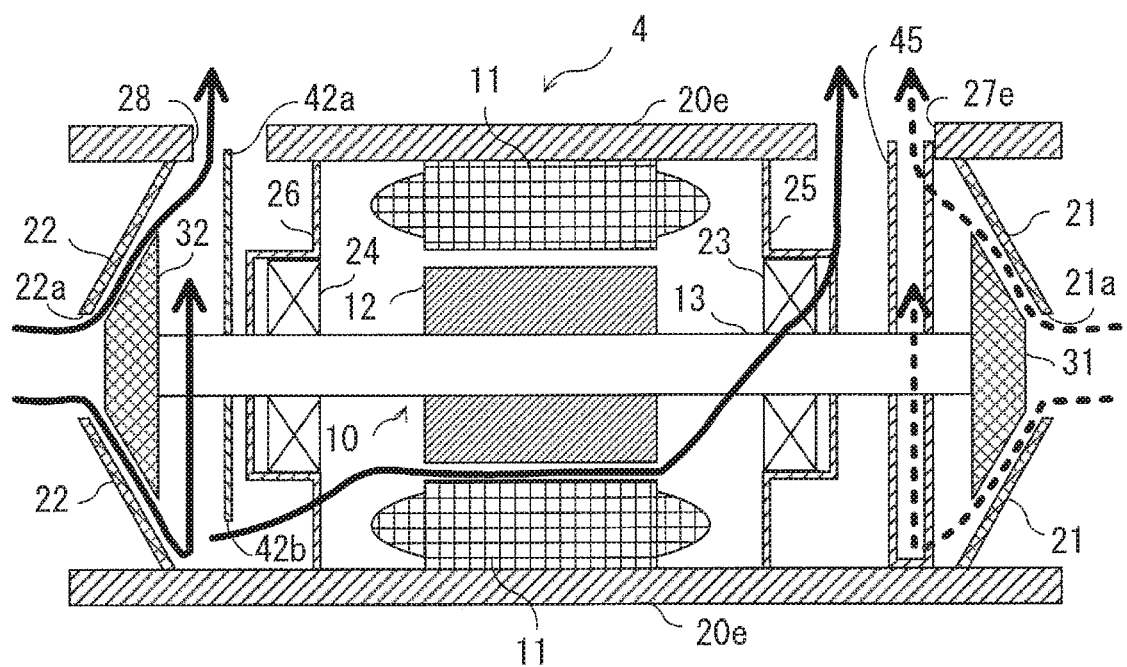
FIG. 23 is a diagram schematically showing air currents in the electric blower shown in FIG. 22.

An electric blower according to a fourth embodiment will be described with reference to FIG. 22 to FIG. 28. FIG. 22 is a diagram showing cross-sectional structure of a configuration example of the electric blower according to the fourth embodiment, and FIG. 23 is a diagram schematically showing air currents in the electric blower 4 shown in FIG. 22. In FIG. 22 to FIG. 28, each part identical to or having a function corresponding to a part shown in FIG. 1, FIG. 11, FIG. 13 or FIG. 17 is assigned the same reference character as that used in FIG. 1, FIG. 11, FIG. 13 or FIG. 17. While the following description of the fourth embodiment will be given on the difference from the first to third embodiments, various examples excluding the difference from the first to third embodiments can be employed in the fourth embodiment.

The description in the third embodiment has been given of both of the case where the first support member and the second support member have the communication hole and the case where the first support member and the second support member have no communication hole. An electric blower including a first support member having the communication hole, a second support member having the communication hole, and an internal casing will be described as the fourth embodiment.

As shown in FIG. 22, the electric blower 4 according to the fourth embodiment includes a first internal casing 45 instead of the first partition part 41*a* in the electric blower 2*a* shown in FIG. 13. The first internal casing 45 is an internal casing having the same function as the first internal casing 43 shown in FIG. 17.

However, as shown in FIG. 22, a casing 20*e* of the electric blower 4 includes a third opening part 27*e* instead of the third opening part 27 in the casing 20 of the electric blower 2*a* shown in FIG. 13. Further, the first internal casing 45 is arranged so that its gas discharge port does not coincide with the third opening part 27*e* but corresponds to a part of the third opening part 27*e* on the first centrifugal fan 31's side. Furthermore, in the electric blower 4 shown in FIG. 22, each of the support members 25, 26 is provided with a communication hole (fourth opening part, fifth opening part).

In the electric blower 4 having such a configuration, the air current generated by the first centrifugal fan 31 can be guided like the air currents indicated by the broken line arrows in FIG. 23 and the air current generated by the second centrifugal fan 32 can be guided like the air currents indicated by the solid line arrows in FIG. 23. Namely, the electric blower 4 guides an air current on one side (the air current generated by the first centrifugal fan 31) directly to the outside of the casing 20*e* through the third opening part 27*e* as indicated by the broken line arrows in FIG. 23, and guides an air current on the other side (the air current generated by the second centrifugal fan 32) to the outside of the casing 20*e* through the third opening part 28 while also causing the air current to pass through the communication hole of the second support member 26 and the communication hole of the first support member 25 and guiding the air current to the outside of the casing 20*e* through the third opening part 27*e* as indicated by the solid line arrows in FIG. 23.

Thus, the collision of the air current generated by the first centrifugal fan 31 and the air current generated by the second centrifugal fan 32 can be prevented in the electric blower 4. Further, since an air current occurs in the part between the support members 25 and 26 where the motor 10 exists as indicated by a solid line arrow in FIG. 23, the promotion of the heat radiation of the motor 10 and the bearings 23 and 24 is also possible. Furthermore, in the third opening part 27*e*, an air current generated by the first centrifugal fan 31 and an air current generated by the second centrifugal fan 32 merge together while being pointed in the same direction along an inner wall and an outer wall of the first internal casing 45, and thus the pressure loss due to the merging can be reduced by the electric blower 4.

(4-2) Modifications

Figure 24:
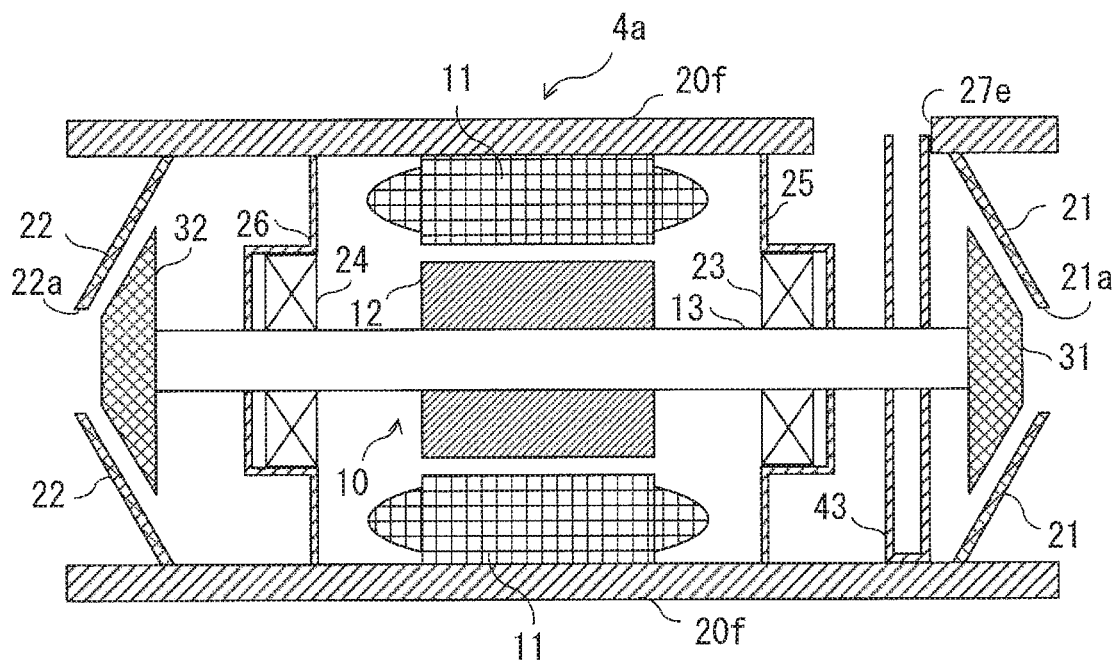
FIG. 24 is a diagram showing cross-sectional structure of another configuration example of the electric blower according to the fourth embodiment.
Figure 25:
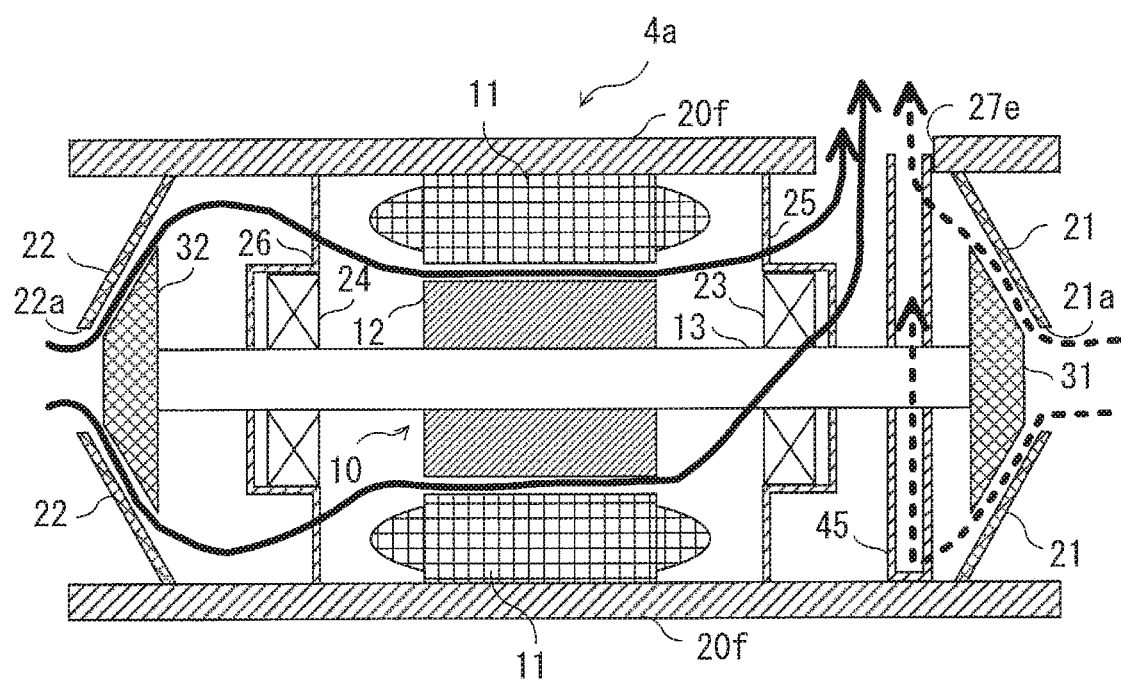
FIG. 25 is a diagram schematically showing air currents in the electric blower shown in FIG. 24.
Figure 26:
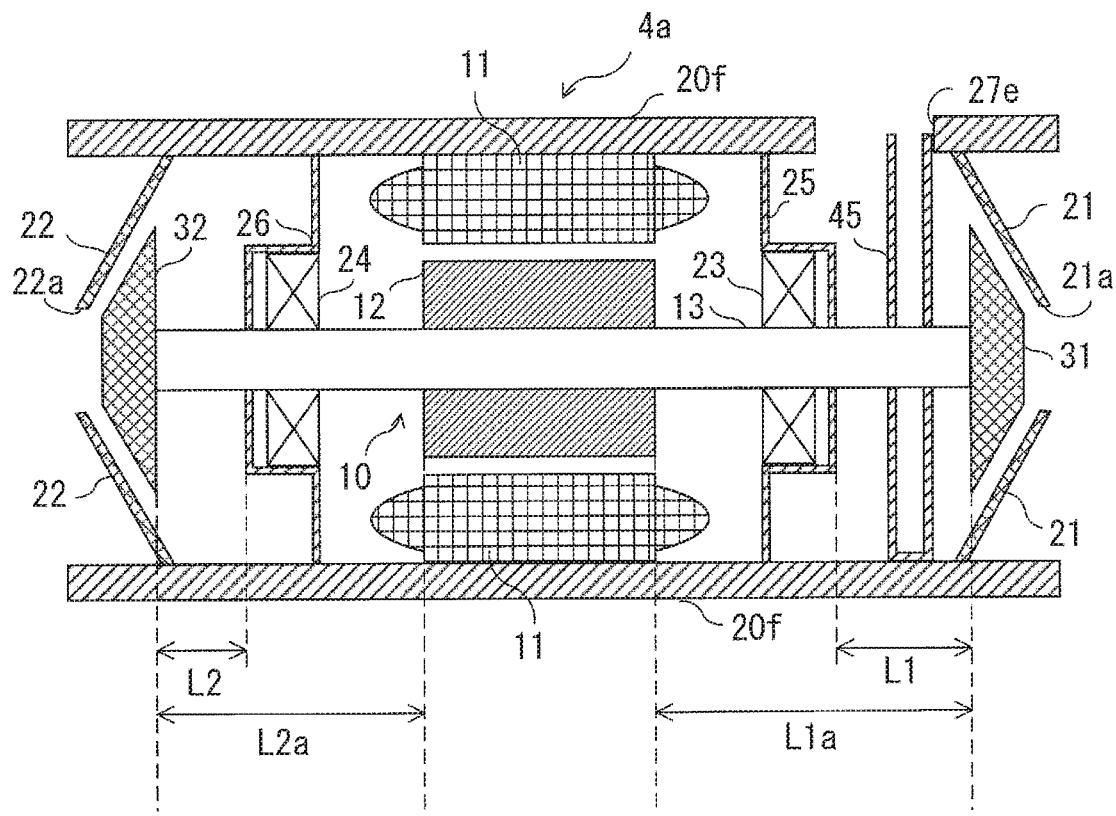
FIG. 26 is a diagram showing distances from a rotor core to a first centrifugal fan and a second centrifugal fan in the electric blower shown in FIG. 24.
Figure 27:
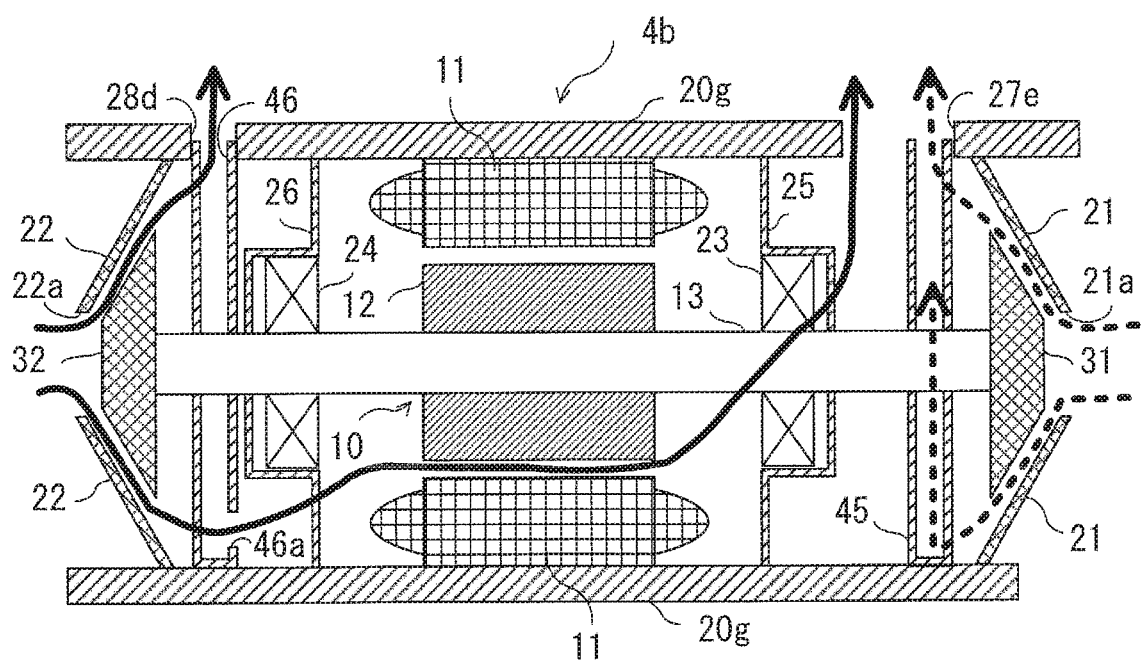
FIG. 27 is a diagram showing cross-sectional structure of another configuration example of the electric blower according to the fourth embodiment.
Figure 28:
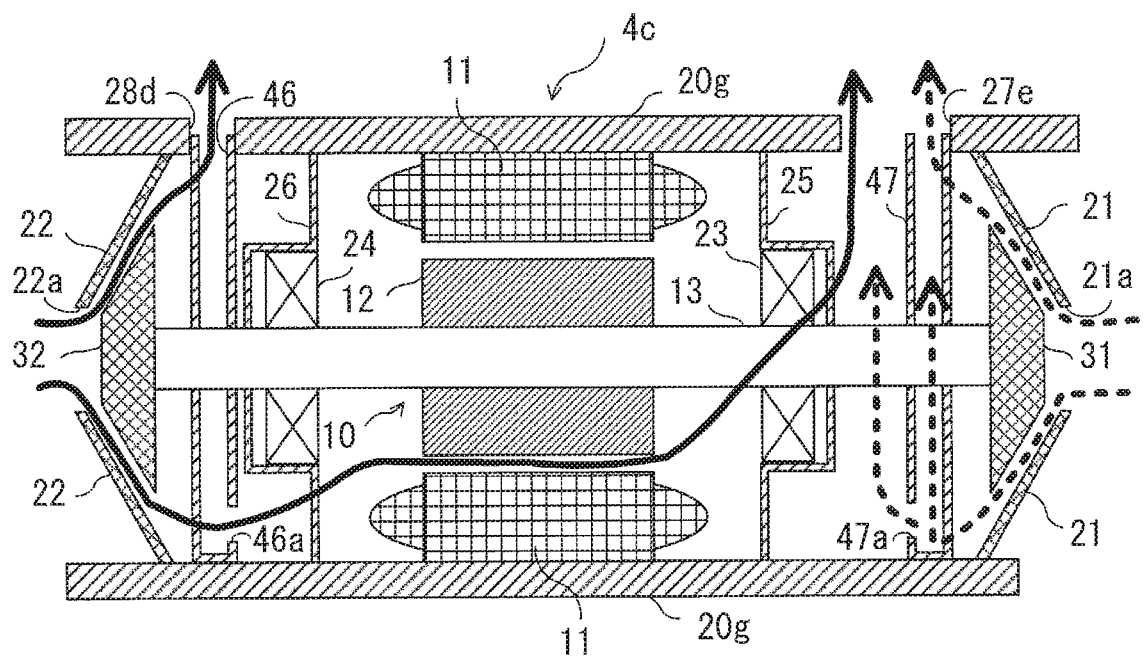
FIG. 28 is a diagram showing cross-sectional structure of another configuration example of the electric blower according to the fourth embodiment.

Modifications of the electric blower according to the fourth embodiment will be described below with reference to FIG. 24 to FIG. 28. FIG. 24, FIG. 27 and FIG. 28 are diagrams showing cross-sectional structure of other configuration examples of the electric blower according to the fourth embodiment that are different from each other. FIG. 25 is a diagram schematically showing air currents in the electric blower 4*a* shown in FIG. 24, and FIG. 26 is a diagram showing distances from the rotor core to the first centrifugal fan 31 and the second centrifugal fan 32 in the electric blower 4*a*. In FIG. 24 to FIG. 28, each part identical to or having a function corresponding to a part shown in FIG. 22 is assigned the same reference character as that used in FIG. 22.

The electric blower 4*a* shown in FIG. 24 does not include the second partition part 42*a* of the electric blower 4 shown in FIG. 22 and includes a casing 20*f* in which the third opening part 28 is filled (i.e., the third opening part 28 is not included) instead of the casing 20*e* of the electric blower 4 shown in FIG. 22.

In the electric blower 4*a* having such a configuration, the air current generated by the first centrifugal fan 31 can be guided like the air currents indicated by the broken line arrows in FIG. 25 and the air current generated by the second centrifugal fan 32 can be guided like the air currents indicated by the solid line arrows in FIG. 25. Namely, the electric blower 4*a* guides the air current on one side (the air current generated by the first centrifugal fan 31) directly to the outside of the casing 20*f* through the third opening part 27*e* as indicated by the broken line arrows in FIG. 25, and causes the air current on the other side (the air current generated by the second centrifugal fan 32) to pass through the communication hole of the second support member 26 and the communication hole of the first support member 25 and guides the air current to the outside of the casing 20*f* through a part of the third opening part 27*e* on the second centrifugal fan 32's side as indicated by the solid line arrows in FIG. 25.

Accordingly, the electric blower 4*a* shown in FIG. 24 facilitates passing of the air current generated by the second centrifugal fan 32 through the communication hole of the second support member 26, pass between the second bearing 24 and the rotary shaft 13, pass through the communication hole of the first support member 25, and pass between the first bearing 23 and the rotary shaft 13, and thus it becomes possible to guide an air current to the space between the support members 25 and 26 more reliably compared to the electric blower 4 shown in FIG. 22. Thus, with the electric blower 4a, the heat radiation of the motor 10 and the bearings 23 and 24 can be promoted reliably and heat radiation efficiency can be increased further compared to the electric blower 4.

Further, the electric blower 4a shown in FIG. 26 is configured so that the distance L1 and the distance L2 differ from each other. Specifically, in this example, the first centrifugal fan 31 and the second centrifugal fan 32 are fixed to the rotary shaft 13 so that the distance L1 is longer than the distance L2. Here, the distance L1 is the distance between the first centrifugal fan 31 and the first support member 25 (i.e., the distance between the centrifugal fan and the support member on the side where the third opening part 27e as a gas discharge port is provided). The distance L2 is the distance between the second centrifugal fan 32 and the second support member 26. By employing such a configuration, the size of the casing 20f, that is, the size of the electric blower 4a can be reduced while securing the third opening part 27e as a gas discharge port, and the degree of freedom in the design of the electric blower can be increased.

It is also possible to employ the distance L1a and the distance L2a shown in FIG. 26 instead of the distance L1 and the distance L2. Here, the distance L1a is the distance between the first centrifugal fan 31 and an end of the rotor core 12 on the first centrifugal fan 31's side (i.e., the distance between the centrifugal fan and an end of the rotor core on the centrifugal fan's side on the side where the third opening part 27e as a gas discharge port is provided). The distance L2a is the distance between the second centrifugal fan 32 and an end of the rotor core 12 on the second centrifugal fan 32's side. Although not illustrated, it is also possible to employ the distance between the first centrifugal fan 31 and the first bearing 23 and the distance between the second centrifugal fan 32 and the second bearing 24 instead of the distance L1 and the distance L2. Similar effects can be achieved by employing any of the above distance pairs to configure the electric blower 4a.

An electric blower 4b shown in FIG. 27 includes a second internal casing 46 instead of the second partition part 42a and includes a casing 20g, having a third opening part 28d adapted to a discharge port of the second internal casing 46, instead of the casing 20e in the electric blower 4 shown in FIG. 22. As shown in FIG. 27, the second internal casing 46 is provided with a second communication hole 46a in comparison with the second internal casing 44 shown in FIG. 17. The second communication hole 46a is a communication hole for making the air current generated by the second centrifugal fan 32 pass through. Specifically, the second communication hole 46a is a communication hole formed through a wall of the second internal casing 46 to establish communication from a channel formed by inner walls of the second internal casing 46 to the second support member 26's side (the rotor core 12's side or the second bearing 24's side), which can be exemplified by a circular communication hole, for example. It is also possible to form second communication holes 46a at a plurality of positions.

In the electric blower 4b having such a configuration, the air current generated by the first centrifugal fan 31 can be guided like the air currents indicated by the broken line arrows in FIG. 27 and the air current generated by the second centrifugal fan 32 can be guided like the air currents indicated by the solid line arrows in FIG. 27. Namely, the electric blower 4b guides the air current on one side (the air current generated by the first centrifugal fan 31) directly to the outside of the casing 20g through the third opening part 27e as indicated by the broken line arrows in FIG. 27. Further, as indicated by the solid line arrows in FIG. 27, the electric blower 4b guides the air current on the other side (the air current generated by the second centrifugal fan 32) directly to the outside of the casing 20g through the third opening part 28d, while also causing the air current to flow through the communication hole of the second support member 26 and the communication hole of the first support member 25 via the second communication hole 46a of the second internal casing 46 and guiding the air current to the outside of the casing 20g through the third opening part 27e.

Accordingly, in the electric blower 4b shown in FIG. 27, hermeticity of the space on the second centrifugal fan 32's side of the second support member 26 is higher than in the electric blower 4 shown in FIG. 22, by which the air current generated by the second centrifugal fan 32 is facilitated to pass through the communication hole of the second support member 26, pass between the second bearing 24 and the rotary shaft 13, pass through the communication hole of the first support member 25, and pass between the first bearing 23 and the rotary shaft 13, and thus it becomes possible to guide an air current to the space between the support members 25 and 26 more reliably. Thus, with the electric blower 4b, the heat radiation of the motor 10 and the bearings 23 and 24 can be promoted reliably and the heat radiation efficiency can be increased further compared to the electric blower 4.

An electric blower 4c shown in FIG. 28 includes a first internal casing 47 instead of the first internal casing 45 in the electric blower 4b shown in FIG. 27. As shown in FIG. 28, the first internal casing 47 is provided with a first communication hole 47a in comparison with the first internal casing 45 shown in FIG. 27. The first communication hole 47a is a communication hole for making the air current generated by the first centrifugal fan 31 pass through. Specifically, the first communication hole 47a is a communication hole formed through a wall of the first internal casing 47 to establish communication from a channel formed by inner walls of the first internal casing 47 to the first support member 25's side (the rotor core 12's side or the first bearing 23's side), which can be exemplified by a circular communication hole, for example. It is also possible to form first communication holes 47a at a plurality of positions.

In the electric blower 4c having such a configuration, the air current generated by the first centrifugal fan 31 can be guided like the air currents indicated by the broken line arrows in FIG. 28 and the air current generated by the second centrifugal fan 32 can be guided like the air currents indicated by the solid line arrows in FIG. 28. Namely, as indicated by the broken line arrows in FIG. 28, the electric blower 4c guides the air current on one side (the air current generated by the first centrifugal fan 31) directly to the outside of the casing 20g through the third opening part 27e, while also causing the air current to flow to the first support member 25's side through the first communication hole 47a of the first internal casing 47 and guiding the air current to the outside of the casing 20g through the third opening part 27e. Incidentally, depending on the shape and position of the first communication hole 47a, the electric blower 4c is capable of guiding the air current discharged through the first communication hole 47a once to the second support member 26's side via the communication hole of the first support member 25, guiding the air current again to the first internal casing 47's side via the communication hole of the first support member 25, and guiding the air current to the outside of the casing 20g through the third opening part 27e. Further, as indicated by the solid line arrows in FIG. 28, the electric blower 4c guides the air current on the other side (the air current generated by the second centrifugal fan 32) directly to the outside of the casing 20g through the third opening part 28d, while also causing the air current to flow through the communication hole of the second support member 26 and the communication hole of the first support member 25 via the second communication hole 46a of the second internal casing 46 and guiding the air current to the outside of the casing 20g through the third opening part 27e.

Accordingly, in the electric blower 4c shown in FIG. 28, the hermeticity of the space on the second centrifugal fan 32's side of the second support member 26 is higher than in the electric blower 4 shown in FIG. 22, by which the air current generated by the second centrifugal fan 32 is facilitated to pass through the communication hole of the second support member 26, pass between the second bearing 24 and the rotary shaft 13, pass through the communication hole of the first support member 25, and pass between the first bearing 23 and the rotary shaft 13, and thus it becomes possible to guide an air current to the space between the support members 25 and 26 more reliably. Thus, with the electric blower 4c, the heat radiation of the motor 10 and the bearings 23 and 24 can be promoted reliably and the heat radiation efficiency can be increased further compared to the electric blower 4.

Although not illustrated, it is also possible in the electric blower 4b shown in FIG. 27 or the electric blower 4c shown in FIG. 28 to configure the third opening part 28d in the same way as the third opening part 27e and thereby make the space between the second internal casing 46 and the second support member 26 directly communicate with the outside. In each of such configurations, both of the air current generated by the first centrifugal fan 31 and the air current generated by the second centrifugal fan 32 can be guided to both of the third opening part 28d and the third opening part 27e, by which the heat radiation of the motor 10 and the bearings 23 and 24 can be promoted.

(4-3) Effects

With the electric blowers 4, 4a, 4b and 4c according to the fourth embodiment, the effect of reducing the force in the axial direction and the accompanying effect of reducing the wear of the bearings 23 and 24 and extending the operating life, achieved by the first embodiment, can be achieved. Further, since the support member 25, 26 has the communication hole, the heat radiation of the motor 10 and the bearings 23 and 24 can be promoted, and the increase in the reliability and the extension of the operating life can be expected for the motor 10 and the bearings 23 and 24. With the electric blowers 4, 4a and 4b, thanks to the internal casing, the collision of the air current generated by the first centrifugal fan 31 and the air current generated by the second centrifugal fan 32 can be prevented, by which the effect of promoting the heat radiation of the motor 10 and the bearings 23 and 24 and the effect of preventing the collision of air currents can be achieved at the same time.

With the electric blower 4a shown in FIG. 26, since the first centrifugal fan 31 and the second centrifugal fan 32 are fixed to the rotary shaft 13 so that the distance L1 and the distance L2 differ from each other, the size of the casing 20f, that is, the size of the electric blower 4a can be reduced while the third opening part 27e as a gas discharge port is secured, for example, and the degree of freedom in the design of the electric blower can be increased.

(5) Fifth Embodiment (5-1) Configuration

Figure 29:
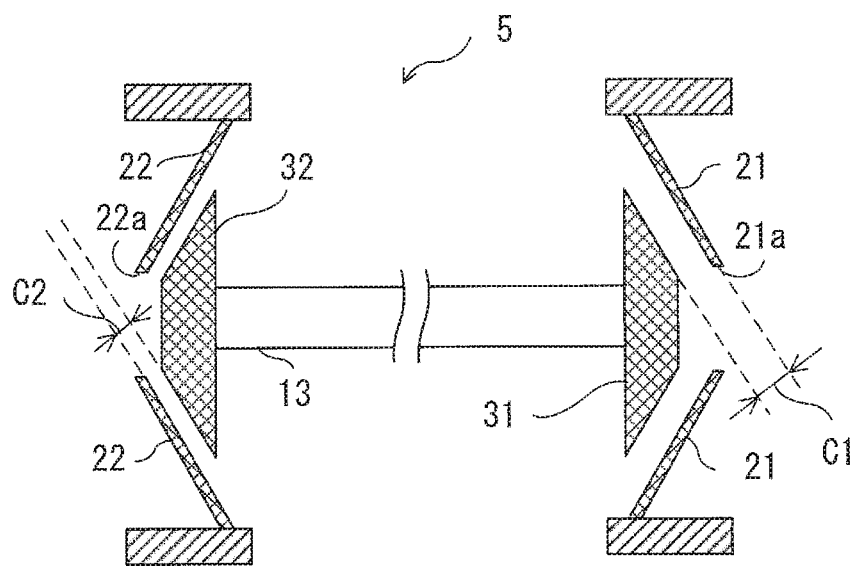
FIG. 29 is a diagram showing cross-sectional structure of a configuration example of an electric blower according to a fifth embodiment.

An electric blower according to a fifth embodiment will be described below with reference to FIG. 29. FIG. 29 is a diagram showing cross-sectional structure of a configuration example of the electric blower according to the fifth embodiment, wherein a central part in the axial direction is omitted for convenience. In FIG. 29, each part identical to or having a function corresponding to a part shown in FIG. 1 is assigned the same reference character as that used in FIG. 1. While the following description of the fifth embodiment will be given on the difference from the first to fourth embodiments, various examples excluding the difference from the first to fourth embodiments can be employed in the fifth embodiment.

As shown in FIG. 29, the electric blower 5 according to the fifth embodiment is configured so that the distance (clearance) C1 between the first centrifugal fan 31 and the first fan cover 21 and the distance (clearance) C2 between the second centrifugal fan 32 and the second fan cover 22 differ from each other in the electric blowers according to the first to fourth embodiments. Incidentally, the distance C1 and the distance C2 differing from each other can be implemented by, for example, adjusting at least one of the axial direction position and the angle of attaching each fan cover 21, 22 to the casing, or can be implemented also by forming the fan covers 21 and 22 in shapes different from each other.

For example, each of the electric blowers 4, 4a, 4b and 4c according to the fourth embodiment shown in FIG. 22 (FIG. 23), FIG. 24 (FIG. 25 and FIG. 26), FIG. 27 and FIG. 28 has structure in which a strong air current is necessary on the second centrifugal fan 32's side rather than on the first centrifugal fan 31's side in order to keep the first force F1 and the second force F2 balanced with each other. Especially in the electric blower 4a shown in FIG. 26, the first centrifugal fan 31 and the second centrifugal fan 32 are fixed to the rotary shaft 13 so as to satisfy the condition that the distance L1 is greater than the distance L2.

On the other hand, if the same centrifugal fans and the same fan covers are used, a stronger air current can be generated with the decrease in the clearance between the centrifugal fan and the fan cover. Therefore, when the structure of any one of the electric blowers 4, 4a, 4b and 4c is used, the electric blower 5 according to the fifth embodiment is desired to employ structure in which the distance C1 is set greater than the distance C2 as shown in FIG. 29.

Further, each of the electric blowers 1a and 1b shown in FIG. 8 and FIG. 9 has structure in which a strong air current is necessary on the first centrifugal fan 31's side rather than on the second centrifugal fan 32's side in order to keep the first force F1 and the second force F2 balanced with each other. Therefore, when the structure of the electric blower 1a or 1b is used, the electric blower 5 according to the fifth embodiment is desired to employ structure in which the distance C1 is set less than the distance C2 although not illustrated.

(5-2) Effects

In the electric blower 5 according to the fifth embodiment, adjusting the amount of work performed by the first centrifugal fan 31 and the amount of work performed by the second centrifugal fan 32 is allowed by allowing the difference between the distance C1 between the first centrifugal fan 31 and the first fan cover 21 and the distance C2 between the second centrifugal fan 32 and the second fan cover 22. Thus, in the electric blower 5, it is facilitated to adjust the thrust load, occurring at the time of rotation of the rotary shaft 13 depending on the shape inside the casing such as the casing 20, so as to keep the first force F1 and the second force F2 balanced with each other, for example. Here, the shape inside the casing means the shape of the inner wall of the casing and the shapes of the motor 10, the bearings 23 and 24 and the support members 25 and 26 as obstacles against air currents, as well as the shape of each partition or internal casing when such a component is included in the casing. Namely, with the electric blower 5, it becomes possible to make an adjustment to reduce air current imbalance caused by obstacles in the air channel or the like (imbalance between the thrust loads applied to the rotary shaft 13 from both sides, namely, from the centrifugal fans 31 and 32) by adjusting the amount of work performed by each centrifugal fan 31, 32, and further, the degree of freedom in the design of the electric blower can be increased.

For example, according to the fifth embodiment, even when a design such that the air channels for the air currents generated by the centrifugal fans 31 and 32 are asymmetric with respect to the plane at the intermediate position between the centrifugal fans 31 and 32 and orthogonal to the axial direction (especially, a design such that the first force and the second force are imbalanced) is unavoidable in the design of the electric blower, by adjusting the distance C1 and the distance C2, an adjustment can be made so as to keep the thrust force due to the air current generated by the first centrifugal fan 31 and the thrust force due to the air current generated by the second centrifugal fan 32 balanced with each other, for example.

(6) Sixth Embodiment (6-1) Configuration

Figure 30:
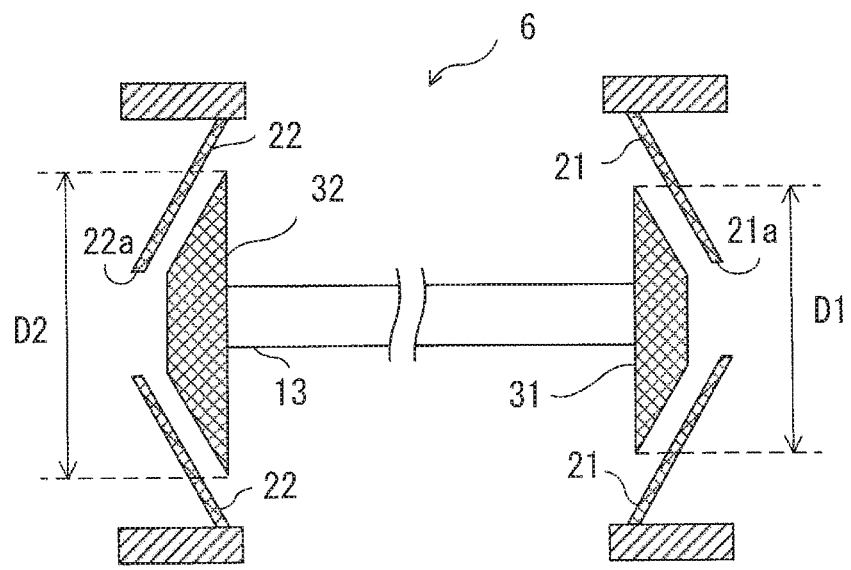
FIG. 30 is a diagram showing cross-sectional structure of a configuration example of an electric blower according to a sixth embodiment.
Figure 31:
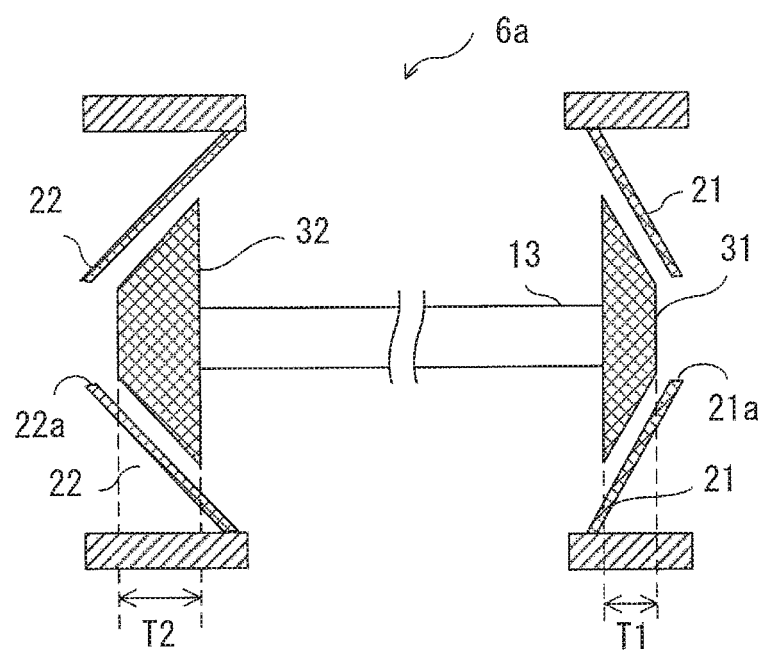
FIG. 31 is a diagram showing cross-sectional structure of another configuration example of the electric blower according to the sixth embodiment.
Figure 32:
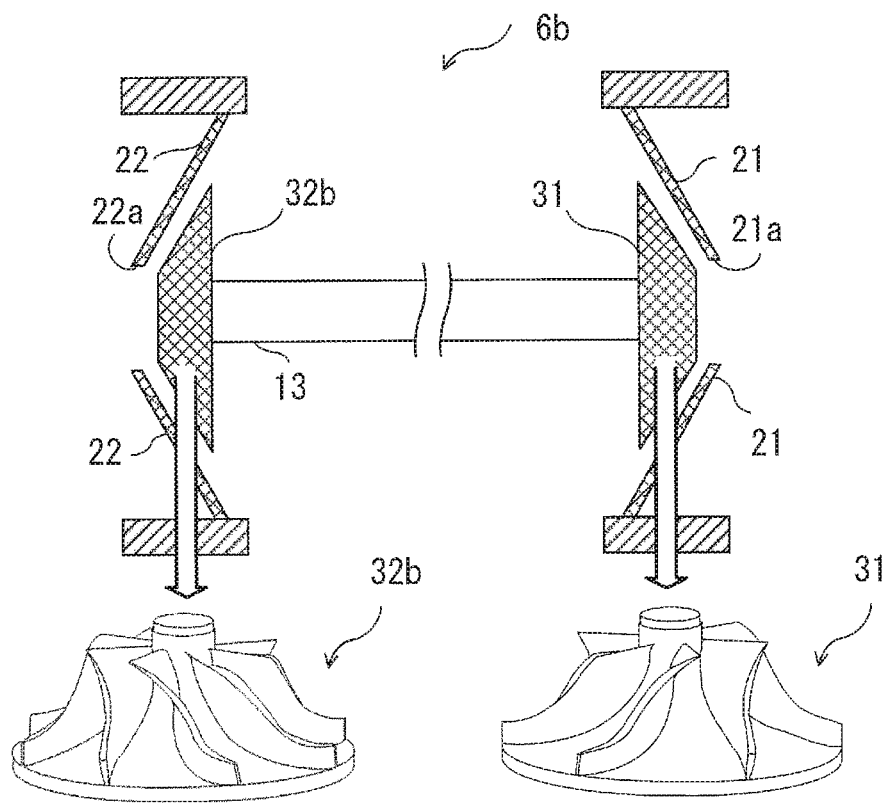
FIG. 32 is a diagram showing cross-sectional structure of another configuration example of the electric blower according to the sixth embodiment.

An electric blower according to a sixth embodiment will be described below with reference to FIG. 30 to FIG. 32. FIG. 30 to FIG. 32 are diagrams showing cross-sectional structure of configuration examples of the electric blower according to the sixth embodiment that are different from each other, wherein a central part in the axial direction is omitted for convenience. In FIG. 30 to FIG. 32, each part identical to or having a function corresponding to a part shown in FIG. 1 is assigned the same reference character as that used in FIG. 1. While the following description of the sixth embodiment will be given on the difference from the first to fifth embodiments, various examples excluding the difference from the first to fifth embodiments can be employed in the sixth embodiment.

As shown in FIG. 30 to FIG. 32, each electric blower according to the sixth embodiment is configured so that the shape of the first centrifugal fan and the shape of the second centrifugal fan differ from each other in the electric blowers according to the first to fifth embodiments. By making the shapes of the first centrifugal fan and the second centrifugal fan differ from each other, the thrust force due to the air current generated by the first centrifugal fan 31 and the thrust force due to the air current generated by the second centrifugal fan 32 can be made to differ from each other.

In the electric blower 6 shown in FIG. 30, an outer diameter as one of parameters (shape parameters) representing the shape of each centrifugal fan (one of parameters representing size among the shape parameters) is made to differ. Namely, as shown in FIG. 30, the electric blower 6 is configured so that the outer diameter D1 of the first centrifugal fan 31 and the outer diameter D2 of the second centrifugal fan 32 differ from each other. The outer diameter D1 may be defined arbitrarily, such as the maximum value among outer diameters of the first centrifugal fan 31, a value obtained by averaging the outer diameters in the thickness direction, or the like. Incidentally, the outer diameter D2 is assumed to be a value defined in the same way as the outer diameter D1 except for being a value regarding the second centrifugal fan 32.

For example, each of the electric blowers 4, 4a, 4b and 4c according to the fourth embodiment shown in FIG. 22 (FIG. 23), FIG. 24 (FIG. 25 and FIG. 26), FIG. 27 and FIG. 28 has structure in which a strong air current is necessary on the second centrifugal fan 32's side rather than on the first centrifugal fan 31's side in order to keep the first force F1 and the second force F2 balanced with each other. On the other hand, each centrifugal fan is capable of generating a stronger air current with the increase in the outer diameter of the centrifugal fan if the other shape parameters are the same. Thus, when the structure of any one of the electric blowers 4, 4a, 4b and 4c is used, the electric blower according to the sixth embodiment is desired to employ structure in which the outer diameter D1 of the first centrifugal fan 31 is set smaller than the outer diameter D2 of the second centrifugal fan 32 as shown in FIG. 30.

Further, each of the electric blowers 1a and 1b shown in FIG. 8 and FIG. 9 has structure in which a strong air current is necessary on the first centrifugal fan 31's side rather than on the second centrifugal fan 32's side in order to keep the first force F1 and the second force F2 balanced with each other. Therefore, when the structure of the electric blower 1a or 1b is used, the electric blower according to the sixth embodiment is desired to employ structure in which the outer diameter D1 is set larger than the outer diameter D2 although not illustrated.

In the electric blower according to the sixth embodiment, adjusting the amount of work performed by the first centrifugal fan 31 and the amount of work performed by the second centrifugal fan 32 is allowed by allowing the difference between the outer diameter D1 of the first centrifugal fan 31 and the outer diameter D2 of the second centrifugal fan 32 as in the electric blower 6 shown in FIG. 30. Thus, in the electric blower according to the sixth embodiment, it is facilitated to adjust the thrust load, occurring at the time of rotation of the rotary shaft 13 depending on the shape inside the casing such as the casing 20, so as to keep the first force F1 and the second force F2 balanced with each other, for example. Namely, with the electric blower according to the sixth embodiment, it becomes possible to make an adjustment to reduce the air current imbalance caused by obstacles in the air channel or the like (imbalance between the thrust loads applied to the rotary shaft 13 from both sides, namely, from the centrifugal fans 31 and 32) by adjusting the amount of work performed by each centrifugal fan 31, 32, and further, the degree of freedom in the design of the electric blower can be increased. Furthermore, with the electric blower according to the sixth embodiment, it becomes unnecessary to change the design of other members such as the fan covers 21 and 22 for the purpose of reducing such imbalance.

For example, according to the sixth embodiment, even when a design such that the air channels are asymmetric is unavoidable in the design of the electric blower, an adjustment can be made so as to keep the thrust force due to the air current generated by the first centrifugal fan and the thrust force due to the air current generated by the second centrifugal fan balanced with each other by selecting centrifugal fans to be attached as the first centrifugal fan and the second centrifugal fan from centrifugal fans differing in the outer diameter.

(6-2) Modifications

In an electric blower 6a shown in FIG. 31, the thickness of the centrifugal fan as one of the shape parameters of the centrifugal fan (one of the parameters representing size among the shape parameters) is made to differ, namely, the thickness T1 of the first centrifugal fan 31 and the thickness T2 of the second centrifugal fan 32 are made to differ from each other. Here, the thickness of the centrifugal fan means height in the axial direction.

Each centrifugal fan is capable of generating a stronger air current with the increase in the thickness of the centrifugal fan if the other shape parameters are the same. The relationship between the thickness T1 of the first centrifugal fan 31 and the thickness T2 of the second centrifugal fan 32 is similar to the relationship between the outer diameter D1 and the outer diameter D2. Thus, when the structure of any one of the electric blowers 4, 4a, 4b and 4c shown in FIG. 22 to FIG. 28 is used, for example, the electric blower 6a is desired to employ structure in which the thickness T1 of the first centrifugal fan 31 is set smaller than the thickness T2 of the second centrifugal fan 32 as shown in FIG. 31. In contrast, when the structure of the electric blower 1a or 1b shown in FIG. 8 or FIG. 9 is used, the electric blower, making the thickness T1 and the thickness T2 differ from each other, is desired to employ structure in which the thickness T1 of the first centrifugal fan 31 is set larger than the thickness T2 of the second centrifugal fan 32 although not illustrated.

As above, by allowing the difference between the thickness T1 of the first centrifugal fan and the thickness T2 of the second centrifugal fan in the electric blower, effects similar to those achieved when the outer diameters are made to differ from each other are achieved. For example, even when a design such that the air channels are asymmetric is unavoidable in the design of the electric blower, an adjustment can be made so as to keep the thrust force due to the air current generated by the first centrifugal fan and the thrust force due to the air current generated by the second centrifugal fan balanced with each other by selecting centrifugal fans to be attached as the first centrifugal fan and the second centrifugal fan from centrifugal fans differing in the thickness.

In an electric blower 6b shown in FIG. 32, the number of blades as one of the shape parameters of the centrifugal fan is made to differ, namely, the number of blades of the first centrifugal fan 31 and the number of blades of a second centrifugal fan 32b are made to differ from each other. Incidentally, the second centrifugal fan 32b is a centrifugal fan provided instead of the aforementioned second centrifugal fan 32.

Each centrifugal fan is generally capable of generating a stronger air current with the increase in the number of blades of the centrifugal fan if the other shape parameters are the same, and the relationship between the number N1 of blades of the first centrifugal fan 31 and the number N2 of blades of the second centrifugal fan 32b is similar to the relationship between the outer diameter D1 and the outer diameter D2. Thus, when the structure of any one of the electric blowers 4, 4a, 4b and 4c shown in FIG. 22 to FIG. 28 is used, for example, the electric blower 6b is desired to employ structure in which the number N1 of blades of the first centrifugal fan 31 is set smaller than the number N2 of blades of the second centrifugal fan 32b as shown in FIG. 32. In contrast, when the structure of the electric blower 1a or 1b shown in FIG. 8 or FIG. 9 is used, the electric blower, making the number N1 of blades and the number N2 of blades differ from each other, is desired to employ structure in which the number N1 of blades of the first centrifugal fan 31 is set larger than the number N2 of blades of the second centrifugal fan 32b although not illustrated.

As above, by allowing the difference between the number N1 of blades of the first centrifugal fan and the number N2 of blades of the second centrifugal fan in the electric blower, effects similar to those achieved when the outer diameters are made to differ from each other are achieved. For example, even when a design such that the air channels are asymmetric is unavoidable in the design of the electric blower, an adjustment can be made so as to keep the thrust force due to the air current generated by the first centrifugal fan and the thrust force due to the air current generated by the second centrifugal fan balanced with each other by selecting centrifugal fans to be attached as the first centrifugal fan and the second centrifugal fan from centrifugal fans differing in the number of blades.

In addition, it is also possible to vary a shape of the blades other than the number of blades, such as height of the blades in the axial direction or surface area of each blade (or total surface area of all the blades of the centrifugal fan), or the shape of a basal part (base) on which the blades are provided by means of attaching or the like, as one of the shape parameters of the centrifugal fan. It is also possible to make two or more of the above-described shape parameters differ between the first centrifugal fan and the second centrifugal fan. Thus, in the sixth embodiment, at least one selected from the outer diameter, the thickness in the axial direction, the number of blades, the surface area of the blade(s), the height of the blades in the axial direction and the shape of the basal part on which the blades are provided is made to differ between the first centrifugal fan and the second centrifugal fan.

(6-3) Effects

With the electric blowers 6, 6a and 6b according to the sixth embodiment, since difference between a shape parameter of the first centrifugal fan and the shape parameter of the second centrifugal fan is allowed, the adjustment to reduce the air current imbalance caused by obstacles in the air channel or the like is facilitated, and further, the degree of freedom in the design of the electric blower can be increased. Furthermore, with the electric blowers according to the sixth embodiment, it becomes unnecessary to change the design of other members such as the fan covers 21 and 22 for the purpose of reducing such imbalance. For example, with the electric blowers according to the sixth embodiment, even when a design such that the air channels for the air currents generated by the first centrifugal fan and the second centrifugal fan are asymmetric is unavoidable in the design of the electric blower, an adjustment can be made so as to keep the thrust force due to the air current generated by the first centrifugal fan and the thrust force due to the air current generated by the second centrifugal fan balanced with each other by selecting centrifugal fans to be attached as the first centrifugal fan and the second centrifugal fan from centrifugal fans differing in a shape parameter.

Further, although explanation is omitted here, similar effects can be achieved also by making the shapes of the first fan cover and the second fan cover differ from each other.

(7) Seventh Embodiment

(7-1) Configuration

Figure 33:
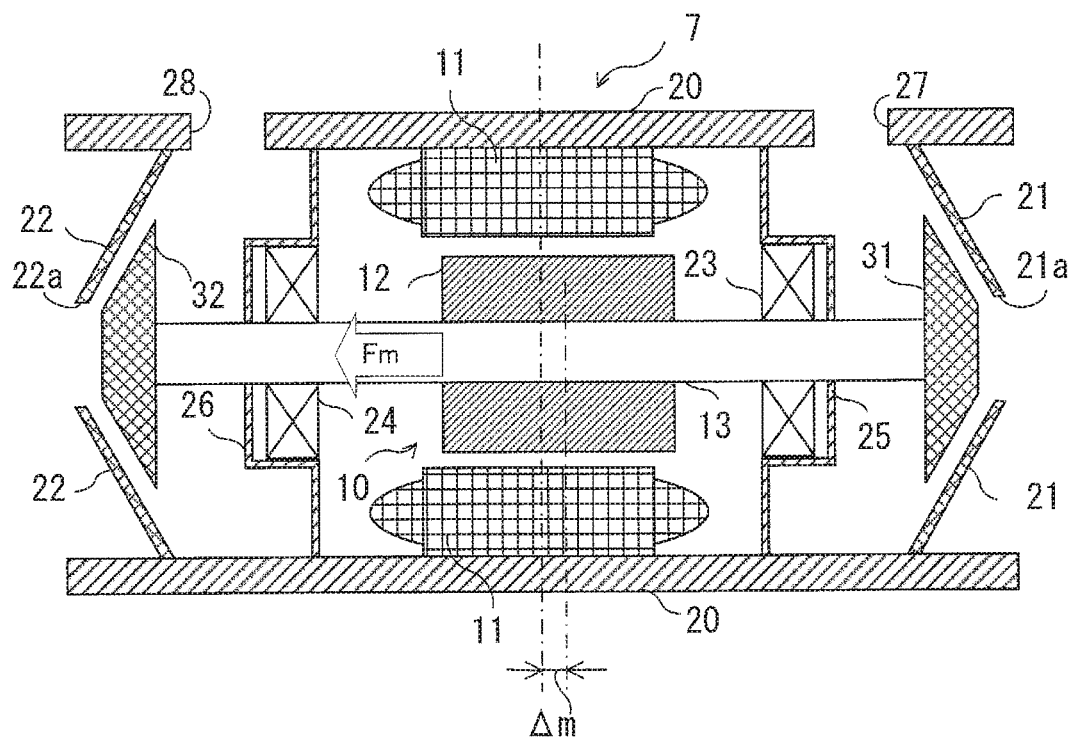
FIG. 33 is a diagram showing cross-sectional structure of a configuration example of an electric blower according to a seventh embodiment.

An electric blower according to a seventh embodiment will be described below with reference to FIG. 33. FIG. 33 is a diagram showing cross-sectional structure of a configuration example of the electric blower according to the seventh embodiment, wherein end parts in the axial direction (parts where the first centrifugal fan and the second centrifugal fan are attached) are omitted for convenience. In FIG. 33, each part identical to or having a function corresponding to a part shown in FIG. 1 is assigned the same reference character as that used in FIG. 1. While the following description of the seventh embodiment will be given on the difference from the first to sixth embodiments, various examples excluding the difference from the first to sixth embodiments can be employed in the seventh embodiment.

As shown in FIG. 33, the electric blower 7 according to the seventh embodiment has structure in which the central position of the rotor core 12 in the axial direction is arranged at a position shifted from the central position of the stator 11 in the axial direction. Namely, in the seventh embodiment, the positional relationship between the stator 11 and the rotor 14 in the axial direction is different and the axial direction center of the rotor 14 is shifted from the axial direction center of the stator 11. In this example, the electric blower 7 has structure in which the central position of the rotor core 12 in the axial direction is arranged at a position shifted from the central position of the stator 11 in the axial direction towards the first centrifugal fan 31's side by a distance $\Delta m$. By employing such structure, magnetic attractive force in the axial direction (thrust direction) works between the stator 11 and the rotor core 12 of the rotor 14. This magnetic attractive force works independently of the revolution speed of the rotor 14, and consequently, thrust force Fm in the direction indicated by the arrow in FIG. 33 works on the rotor 14 and effects similar to those of the fifth and sixth embodiments are achieved.

(7-2) Effects

With the electric blower 7 according to the seventh embodiment, since arbitrarily shifting the positional relationship of the rotor 14 with the stator 11 in the axial direction is allowed, the adjustment to reduce the air current imbalance caused by obstacles in the air channel or the like is facilitated, and further, the degree of freedom in the design of the electric blower can be increased. For example, with the electric blower 7 according to the seventh embodiment, even when a design such that the air channels for the air currents generated by the first centrifugal fan 31 and the second centrifugal fan 32 are asymmetric is unavoidable in the design of the electric blower, an adjustment can be made so as to keep the thrust force Fm, the thrust force due to the air current generated by the first centrifugal fan 31 and the thrust force due to the air current generated by the second centrifugal fan 32 balanced by adjusting the distance $\Delta m$.

(8) Eighth Embodiment

(8-1) Configuration

Figure 34:
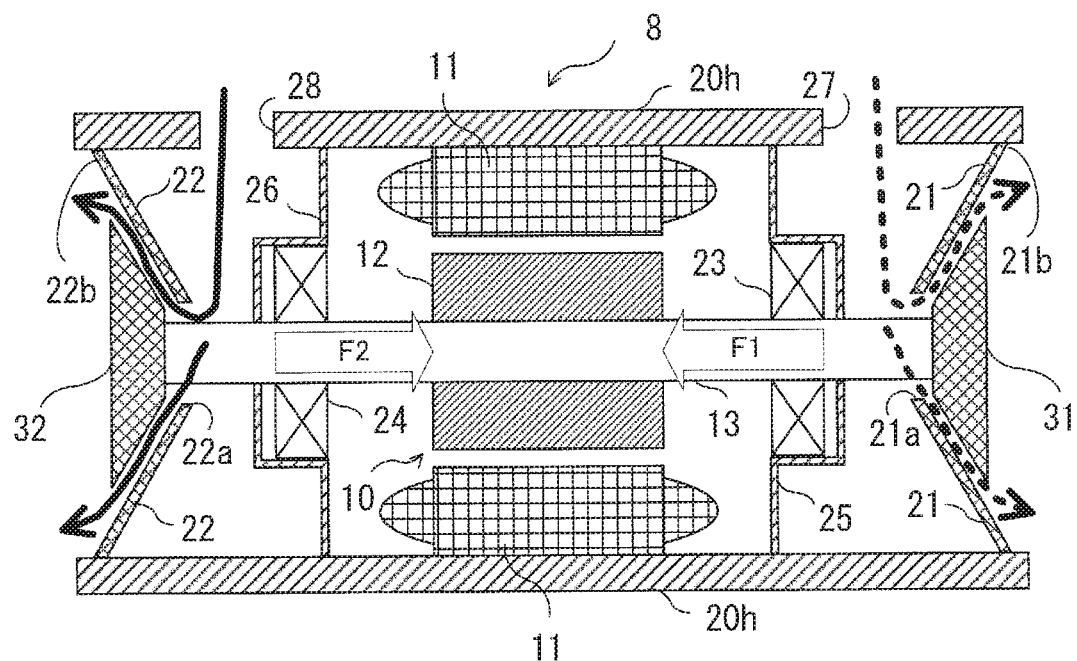
FIG. 34 is a diagram showing cross-sectional structure of a configuration example of an electric blower according to an eighth embodiment.

An electric blower according to an eighth embodiment will be described below with reference to FIG. 34. FIG. 34 is a diagram showing cross-sectional structure of a configuration example of the electric blower according to the eighth embodiment. In FIG. 34, each part identical to or having a function corresponding to a part shown in FIG. 1 is assigned the same reference character as that used in FIG. 1. While the following description of the eighth embodiment will be given on the difference from the first to seventh embodiments (especially, the difference from the first embodiment), various examples excluding the difference from the first to seventh embodiments can be employed in the eighth embodiment.

In the first to seventh embodiments, the description has been given of cases where both of the centrifugal fans 31 and 32 suck in gas from the outside to the inside of the casing 20 as an example of the case where the first force F1 and the second force F2 are in directions opposite to each other.

As shown in FIG. 34, the electric blower 8 according to the eighth embodiment can be configured so that both of the centrifugal fans 31 and 32 suck gas from the inside of a casing 20h and discharge the gas to the outside of the casing 20h. Here, the casing 20h is configured by inverting each fan cover 21, 22 with respect to a plane orthogonal to the axial direction in the casing 20 shown in FIG. 1. Further, each centrifugal fan 31, 32 shown in FIG. 34 is fixed to the rotary shaft 13 in the opposite direction compared to the centrifugal fan 31, 32 shown in FIG. 1. Furthermore, in the electric blower 8, the first centrifugal fan 31 is fixed outside the casing 20h (on the outside of the first opening part 21a in the axial direction) and the second centrifugal fan 32 is also fixed outside the casing 20h (on the outside of the second opening part 22a in the axial direction).

The fan covers 21 and 22 will be explained below along with the eighth embodiment.

As shown in FIG. 34, the first fan cover 21 includes a first opening part 21a as a port for sucking out gas, an inclined surface (first inclined surface) against which the air current generated in the centrifugal direction by the first centrifugal fan 31 (discharged gas) collides, and an opening part 21b as a port for discharging the gas. As shown in FIG. 34, the first fan cover 21 can have a cylindrical shape centering at the rotation axis of the rotary shaft 13 such that the diameter (inner diameter, outer diameter) increases with the increase in the distance from the rotor core 12. However, the shape of the first fan cover 21 is not limited to this example. With such a configuration and the positional relationship with the first centrifugal fan 31, the first fan cover 21 causes the gas sucked out through the first opening part 21a by the rotation of the first centrifugal fan 31 to flow in the centrifugal direction, changes the direction of the air current (wind direction) with the aforementioned first inclined surface, and discharges the gas through the opening part 21b. Incidentally, the first fan cover 21 does not cover the first centrifugal fan 31 at least in the first opening part 21a and the opening part 21b. The first fan cover 21 is fixed to the inner circumferential wall of the casing 20h at the opening part 21b.

Further, as shown in FIG. 34, the second fan cover 22 includes a second opening part 22a as a port for sucking out gas, an inclined surface (second inclined surface) against which the air current generated in the centrifugal direction by the second centrifugal fan 32 (discharged gas) collides, and an opening part 22b as a port for discharging the gas. As shown in FIG. 34, the second fan cover 22 can have a cylindrical shape centering at the rotation axis of the rotary shaft 13 such that the diameter (inner diameter, outer diameter) increases with the increase in the distance from the rotor core 12. However, the shape of the second fan cover 22 is not limited to this example. With such a configuration and the positional relationship with the second centrifugal fan 32, the second fan cover 22 causes the gas sucked out through the second opening part 22a by the rotation of the second centrifugal fan 32 to flow in the centrifugal direction, changes the direction of the air current (wind direction) with the aforementioned second inclined surface, and discharges the gas through the opening part 22b. Incidentally, the second fan cover 22 does not cover the second centrifugal fan 32 at least in the second opening part 22a and the opening part 22b. The second fan cover 22 is fixed to the inner circumferential wall of the casing 20h at the opening part 22b.

With the above-described configuration, for example, the electric blower 8 according to the eighth embodiment causes the first force F1 as force heading from the first end side (end on the side where the first centrifugal fan 31 is attached) towards the second end side (end on the side where the second centrifugal fan 32 is attached) of the rotary shaft 13 and causes the second force F2 as force heading from the second end side towards the first end side of the rotary shaft 13. Namely, in the electric blower 8, the first direction is the direction heading from the first end side towards the second end side and the second direction is the direction heading from the second end side towards the first end side. Also in the eighth embodiment, the first force F1 and the second force F2 are desired to balance with each other.

As indicated by the broken line arrows in FIG. 34, with the rotation of the first centrifugal fan 31, the electric blower 8 sucks gas from the third opening part 27 via the first opening part 21a of the first fan cover 21 and guides the gas to emit (discharge) the gas to the outside of the casing 20h. Further, as indicated by the solid line arrows in FIG. 34, with the rotation of the second centrifugal fan 32, the electric blower 8 sucks gas from the third opening part 28 via the second opening part 22a of the second fan cover 22 and guides the gas to emit the gas to the outside of the casing 20h.

(8-2) Effects

With the electric blower 8 according to the eighth embodiment, effects similar to those achieved by any one of the first to seventh embodiments can be achieved by employing a different configuration. Namely, when the electric blower 8 is configured to cause the first force F1 in the direction heading from the first end towards the second end of the rotary shaft 13 and to cause the second force F2 in the direction heading from the second end towards the first end of the rotary shaft 13, the electric blower can be installed in electric equipment used for the purpose of suction by connecting pipes having suction ports or the like to the third opening parts 27 and 28, for example. However, the electric blower 8 can also be installed in electric equipment used for the purpose of blowing out air by connecting pipes having air blow ports or the like to the opening parts 21b and 22b, for example.

(9) Ninth Embodiment (9-1) Configuration

Figure 35:
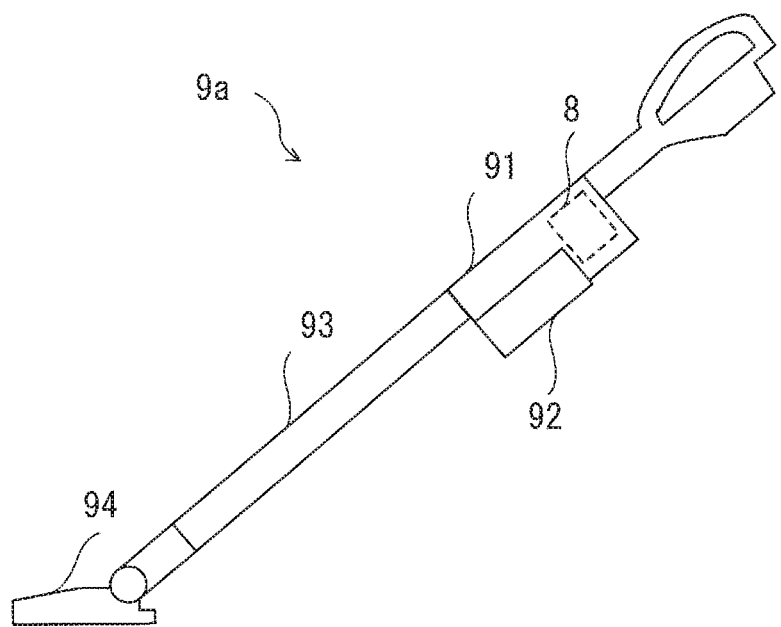
FIG. 35 is a perspective view showing an example of a vacuum cleaner as electric equipment according to a ninth embodiment.

Electric equipment according to a ninth embodiment will be described below with reference to FIG. 35 and FIG. 36. FIG. 35 is a perspective view showing an example of a vacuum cleaner as the electric equipment according to the ninth embodiment, and FIG. 36 is a perspective view showing an example of a Jet Towel as the electric equipment according to the ninth embodiment.

The electric blowers according to the first to eighth embodiments can be installed in various types of electric equipment. For example, a vacuum cleaner 9a shown in FIG. 35 includes a main body 91, a dust collection part 92 attached to the main body 91, a duct 93, and a suction nozzle 94 attached to the tip end of the duct 93. The main body 91 is also provided with an exhaust port. In the vacuum cleaner 9a, the electric blower 8 shown in FIG. 34 can be installed in the main body 91. For example, it is possible in the vacuum cleaner 9a to connect the third opening parts 27 and 28 of the electric blower 8 to the duct 93's side, connect the opening parts 21b and 22b of the fan covers 21 and 22 to the exhaust port's side, and provide the dust collection part 92 between the duct 93 and the third opening parts 27 and 28 or between the exhaust port and the opening parts 21b and 22b. Further, the vacuum cleaner 9a can be equipped with any one of the electric blowers according to the first to eighth embodiments; for example, the vacuum cleaner 9a can include the electric blower 1 shown in FIG. 1, instead of the electric blower 8.

Figure 36:
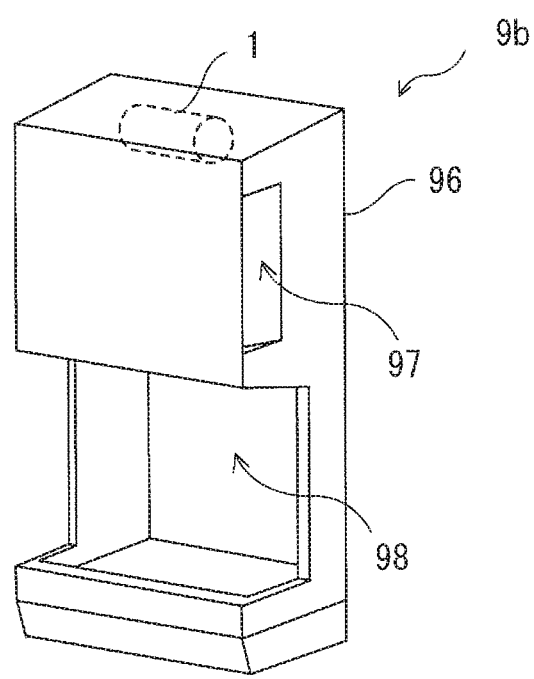
FIG. 36 is a perspective view showing an example of a Jet Towel as the electric equipment according to the ninth embodiment.

In a Jet Towel 9b shown in FIG. 36, a main body 96 is provided with a suction port 97 and an air blow port 98, and the electric blower 1 shown in FIG. 1 can be installed in the main body 96. For example, it is possible in the Jet Towel 9b to connect the opening parts 21a and 22a of the fan covers 21 and 22 of the electric blower 1 to the suction port 97's side, connect the third opening parts 27 and 28 to the air blow port 98's side, and include a heat source which is not illustrated between the air blow port 98 and the third opening parts 27 and 28. Further, the Jet Towel 9b can be equipped with any one of the electric blowers according to the first to eighth embodiments; for example, the Jet Towel 9b can include the electric blower 8 shown in FIG. 34, instead of the electric blower 1.

(9-2) Effects

According to the ninth embodiment, electric equipment including an electric blower achieving the effects of any one of the first to eighth embodiments can be provided.

What is claimed is:

1. An electric blower comprising:
a motor including a stator, a rotor core, and a rotary shaft fixed to the rotor core;
a first centrifugal fan fixed to a first end side of the rotary shaft;
a second centrifugal fan fixed to a second end side of the rotary shaft opposite to the first end side; and
a casing surrounding the stator, the rotor core, the rotary shaft, the first centrifugal fan and the second centrifugal fan,
wherein the casing includes:
a first opening part provided on the first end side and making an air current generated by the first centrifugal fan pass through;
a second opening part provided on the second end side and making an air current generated by the second centrifugal fan pass through; and
a third opening part provided between the first centrifugal fan and the second centrifugal fan,
wherein first force applied by the first centrifugal fan to the rotary shaft in a first direction in an axial direction of the rotary shaft and second force applied by the second centrifugal fan to the rotary shaft in a second direction in the axial direction of the rotary shaft are opposite to each other during rotation of the rotary shaft,
wherein the air currents generated by the first centrifugal fan flow through the first opening part into the casing without passing through the second centrifugal fan, thereby passing between the stator and the rotor core in the casing, and the air currents generated by the second centrifugal fan flow through the second opening part into the casing without passing through the first centrifugal fan, thereby passing between the stator and the rotor core in the casing.

2. The electric blower according to claim 1, wherein
the first direction is a direction heading from the second end side towards the first end side, and
the second direction is a direction heading from the first end side towards the second end side.

3. The electric blower according to claim 1, wherein
the first direction is a direction heading from the first end side towards the second end side, and
the second direction is a direction heading from the second end side towards the first end side.

4. The electric blower according to claim 1, wherein the casing includes:
a first fan cover having the first opening part and directing a centrifugal direction air current generated by the first centrifugal fan in the axial direction; and
a second fan cover having the second opening part and directing a centrifugal direction air current generated by the second centrifugal fan in the axial direction.

5. The electric blower according to claim 4, further comprising:
a first bearing rotatably supporting the rotary shaft on the first end side;
a first support member fixed in the casing and supporting the first bearing;
a second bearing rotatably supporting the rotary shaft on the second end side;
a second support member fixed in the casing and supporting the second bearing; and
a first partition part fixed in the casing and changing a direction of the air current generated by the first centrifugal fan at a position between the first centrifugal fan and the first support member,
wherein the first partition part is a first casing having a first channel connecting the first fan cover and the third opening part.

6. The electric blower according to claim 5, further comprising a second partition part fixed in the casing and changing a direction of the air current generated by the second centrifugal fan at a position between the second centrifugal fan and the second support member,
wherein the second partition part is a second casing having a second channel connecting the second fan cover and the third opening part.

7. The electric blower according to claim 4, wherein a distance between the first centrifugal fan and the first fan cover and a distance between the second centrifugal fan and the second fan cover differ from each other.

8. The electric blower according to claim 1, further comprising:
a first bearing rotatably supporting the rotary shaft on the first end side;
a first support member fixed in the casing and supporting the first bearing;
a second bearing rotatably supporting the rotary shaft on the second end side; and
a second support member fixed in the casing and supporting the second bearing.

9. The electric blower according to claim 8, wherein
the first support member has a fourth opening part, and
the second support member has a fifth opening part.

10. The electric blower according to claim 8, further comprising a first partition part fixed in the casing and changing a direction of the air current generated by the first centrifugal fan at a position between the first centrifugal fan and the first support member.

11. The electric blower according to claim 10, wherein the first partition part has a first communication hole making the air current generated by the first centrifugal fan pass through.

12. The electric blower according to claim 10, further comprising a second partition part fixed in the casing and changing a direction of the air current generated by the second centrifugal fan at a position between the second centrifugal fan and the second support member.

13. The electric blower according to claim 12, wherein the second partition part has a second communication hole making the air current generated by the second centrifugal fan pass through.

14. The electric blower according to claim 8, wherein a distance between the first centrifugal fan and the first support member and a distance between the second centrifugal fan and the second support member differ from each other.

15. The electric blower according to claim 1, wherein
a central position of the rotor core in the axial direction is arranged at a position shifted from a central position of the stator in the axial direction.

16. The electric blower according to claim 1, wherein a shape of the first centrifugal fan and a shape of the second centrifugal fan differ from each other.

17. The electric blower according to claim 1, wherein the first force and the second force are balanced with each other.

18. Electric equipment comprising the electric blower according to claim 1.

* * * * *